(12) United States Patent
Park et al.

(10) Patent No.: US 12,739,534 B2
(45) **Date of Patent: *Sep. 15, 2026**

(54) IMAGE PROCESSING DEVICE CONFIGURED TO REGENERATE TIMESTAMP AND ELECTRONIC DEVICE INCLUDING THE SAME

(71) Applicant: Samsung Electronics Co., Ltd., Suwon-si (KR)

(72) Inventors: Keun Joo Park, Seoul (KR); Junseok Kim, Hwaseong-si (KR); Yohan Roh, Suwon-si (KR); Hyunsurk Ryu, Hwaseong-si (KR); Jooyeon Woo, Hwasung-si (KR); Hyunku Lee, Hwasung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

This patent is subject to a terminal disclaimer.

(21) Appl. No.: 18/933,217

(22) Filed: Oct. 31, 2024

(65) Prior Publication Data

US 2025/0063271 A1 Feb. 20, 2025

Related U.S. Application Data

(63) Continuation of application No. 18/150,407, filed on Jan. 5, 2023, now Pat. No. 12,395,758, which is a (Continued)

(30) Foreign Application Priority Data

Mar. 8, 2017 (KR) ........................ 10-2017-0029687
Nov. 2, 2017 (KR) ........................ 10-2017-0145538

(51) Int. Cl.
*H04N 25/77* (2023.01)
*G06F 16/23* (2019.01)
(Continued)

(52) U.S. Cl.
CPC ......... *H04N 25/77* (2023.01); *G06F 16/2322* (2019.01); *G06F 16/583* (2019.01);
(Continued)

(58) Field of Classification Search
CPC .... H04N 5/3572; H04N 5/351; H04N 5/3454; H04N 5/3456
(Continued)

(56) References Cited

U.S. PATENT DOCUMENTS 6,253,161 B1 6/2001 Arias-Estrada
6,833,849 B1 12/2004 Kurokawa et al.
(Continued)

FOREIGN PATENT DOCUMENTS

CN 103516946 A 1/2014
CN 105160703 A 12/2015
(Continued)

OTHER PUBLICATIONS

Office Action for U.S. Appl. No. 18/150,407 mailed on Feb. 11, 2025.

(Continued)

*Primary Examiner* — Lin Ye
*Assistant Examiner* — Chan T Nguyen
(74) *Attorney, Agent, or Firm* — Fish & Richardson P.C.

(57) ABSTRACT

An image processing device includes a vision sensor and a processor. The vision sensor generates a plurality of events in which an intensity of light changes and generates a plurality of timestamps depending on times when the events occur. In addition, the processor may regenerate a timestamp of a pixel where an abnormal event occurs, based on temporal correlation of the events.

20 Claims, 22 Drawing Sheets

Related U.S. Application Data continuation of application No. 16/689,579, filed on Nov. 20, 2019, now Pat. No. 11,575,849, which is a continuation of application No. 15/914,073, filed on Mar. 7, 2018, now Pat. No. 10,531,031.

(51) Int. Cl.

| | |
|---|---|
| ***G06F 16/583*** | (2019.01) |
| ***H04N 25/40*** | (2023.01) |
| ***H04N 25/47*** | (2023.01) |
| ***H04N 25/683*** | (2023.01) |
| ***H04N 25/772*** | (2023.01) |
| ***H04N 25/79*** | (2023.01) |
| ***H05B 39/04*** | (2006.01) |
| ***H05B 47/11*** | (2020.01) |
| ***H05B 47/155*** | (2020.01) |
| ***H05B 47/16*** | (2020.01) |

(52) U.S. Cl.

CPC ............ *H04N 25/40* (2023.01); *H04N 25/47* (2023.01); *H04N 25/683* (2023.01); *H04N 25/772* (2023.01); *H04N 25/79* (2023.01); *H05B 39/042* (2013.01); *H05B 47/11* (2020.01); *H05B 47/155* (2020.01); *H05B 47/16* (2020.01); *Y02B 20/00* (2013.01)

(58) Field of Classification Search

USPC .......................................................... 348/251

See application file for complete search history.

(56) References Cited

U.S. PATENT DOCUMENTS

| | | | | |
|---|---|---|---|---|
| 7,728,269 | B2 | 6/2010 | Lichtsteiner et al. | |
| 9,058,744 | B2 | 6/2015 | Huang et al. | |
| 9,143,680 | B2 | 9/2015 | Lee et al. | |
| 9,275,284 | B2 | 3/2016 | Gurbuz | |
| 9,667,898 | B2 | 5/2017 | Vogelsang et al. | |
| 10,015,502 | B2 | 7/2018 | Jeong et al. | |
| 10,346,506 | B2 | 7/2019 | Park et al. | |
| 10,368,057 | B1 | 7/2019 | Saran et al. | |
| RE48,780 | E | 10/2021 | Lee et al. | |
| 2006/0023109 | A1* | 2/2006 | Mabuchi | H04N 25/00 348/340 |
| 2009/0174802 | A1 | 7/2009 | Vogel et al. | |
| 2012/0299173 | A1 | 11/2012 | Mohammed et al. | |
| 2013/0028034 | A1 | 1/2013 | Fujisawa | |
| 2013/0070109 | A1* | 3/2013 | Gove | H04N 25/40 348/207.1 |
| 2013/0112848 | A1 | 5/2013 | Lin et al. | |
| 2013/0277539 | A1 | 10/2013 | Smilansky et al. | |
| 2013/0330393 | A1 | 12/2013 | Pacetti | |
| 2013/0335595 | A1 | 12/2013 | Lee et al. | |
| 2014/0009650 | A1* | 1/2014 | Kim | H04N 23/45 348/294 |
| 2014/0104225 | A1 | 4/2014 | Davidson et al. | |
| 2014/0118257 | A1 | 5/2014 | Baldwin | |
| 2015/0030204 | A1 | 1/2015 | Lee et al. | |
| 2015/0095818 | A1 | 4/2015 | Lee et al. | |
| 2015/0237289 | A1 | 8/2015 | Nishihara | |
| 2015/0281549 | A1 | 10/2015 | Fridental | |
| 2016/0011654 | A1* | 1/2016 | Lee | G06N 3/049 345/156 |
| 2016/0079206 | A1 | 3/2016 | Cho et al. | |
| 2016/0080670 | A1 | 3/2016 | Rangan et al. | |
| 2016/0086076 | A1 | 3/2016 | Alvarez-Icaza Rivera et al. | |
| 2016/0094787 | A1 | 3/2016 | Govil et al. | |
| 2016/0109955 | A1 | 4/2016 | Park et al. | |
| 2016/0139795 | A1 | 5/2016 | Park et al. | |
| 2016/0203614 | A1 | 7/2016 | Wang et al. | |
| 2016/0217584 | A1 | 7/2016 | Shin et al. | |
| 2016/0241805 | A1 | 8/2016 | Nishihara | |
| 2016/0274643 | A1 | 9/2016 | Liu et al. | |
| 2016/0307325 | A1 | 10/2016 | Wang et al. | |
| 2016/0307326 | A1 | 10/2016 | Wang | |
| 2016/0309140 | A1 | 10/2016 | Wang et al. | |
| 2016/0320834 | A1 | 11/2016 | Lee et al. | |
| 2016/0330393 | A1 | 11/2016 | Kim et al. | |
| 2016/0359711 | A1 | 12/2016 | Deen et al. | |
| 2017/0003121 | A1 | 1/2017 | Brandli et al. | |
| 2017/0032536 | A1 | 2/2017 | Lee et al. | |
| 2017/0075426 | A1 | 3/2017 | Camacho Perez et al. | |
| 2018/0032150 | A1 | 2/2018 | Lee et al. | |
| 2018/0109741 | A1 | 4/2018 | Sukegawa et al. | |
| 2018/0189959 | A1* | 7/2018 | Berner | H04N 25/44 |
| 2018/0191982 | A1 | 7/2018 | Berner et al. | |
| 2018/0262705 | A1 | 9/2018 | Park et al. | |
| 2018/0308253 | A1 | 10/2018 | Ryu et al. | |
| 2019/0244377 | A1 | 8/2019 | Yu | |
| 2020/0099824 | A1 | 3/2020 | Benemann et al. | |

FOREIGN PATENT DOCUMENTS

| | | | |
|---|---|---|---|
| CN | 105391933 | A | 3/2016 |
| CN | 106028147 | A | 10/2016 |
| CN | 106095262 | A | 11/2016 |
| CN | 106127810 | A | 11/2016 |
| KR | 10-2013-0142913 | A | 12/2013 |
| KR | 10-2016-0092289 | A | 8/2016 |
| KR | 10-1653622 | B1 | 9/2016 |
| KR | 2016-0112219 | A | 9/2016 |
| KR | 10-2016-0128030 | A | 11/2016 |
| KR | 2017-0088057 | A | 8/2017 |

OTHER PUBLICATIONS

Notice of Allowance for U.S. Appl. No. 16/689,535 mailed on Aug. 3, 2021.

Corrected Notice of Allowability for U.S. Appl. No. 16/689,535 mailed on Nov. 18, 2021.

Notice of Allowance for U.S. Appl. No. 18/150,407 mailed on Apr. 29, 2025.

* cited by examiner 110b
115b
111b
Row AER
Pixel Array
(M×N)
PXs
1
2
3
4
5
6
7
8
Pol(s)
116b
K-th PX
Group
RST(s)
Time
Stamper
CR
ACK
114b
Column AER
113b
Control
Logic
C_ADDR
Packetizer / IO Circuit
117b
TS(s),Pol(s),
GP_ADDR
Packet Moving Direction of Device

| 0 | 0 | 3 | 2 | 1 |
|---|---|---|---|---|
| 0 | 0 | 0 | 3 | 2 |
| 0 | 0 | 0 | 0 | 3 |
| 3 | 2 | 0 | 0 | 0 |
| 4 | 3 | 0 | 0 | 0 |

Noise/Hot PX?

TS Regenerator (122)

| 0 | 0 | 3 | 2 | 1 |
|---|---|---|---|---|
| 0 | 0 | 0 | 3 | 2 |
| 0 | 0 | 0 | 0 | 3 |
| 3 | 2 | 0 | 0 | 0 |
| 4 | 3 | 0 | 0 | 0 |

Normal PX

Figure 21:
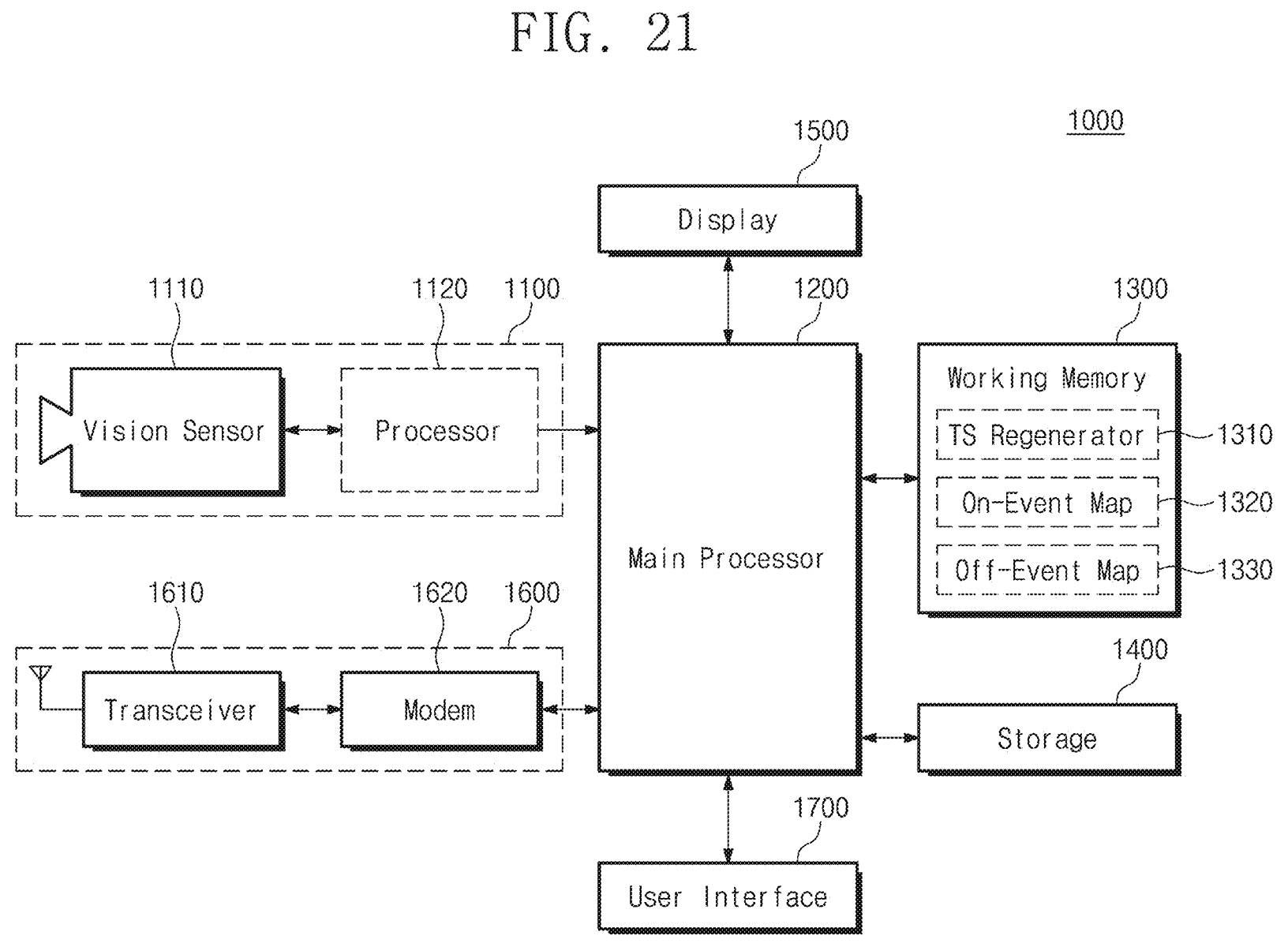

1300 Working Memory
1310 TS Regenerator
1320 On-Event Map
1330 Off-Event Map
1400 Storage
1500 Display
1200 Main Processor
1700 User Interface
1100
1110 Vision Sensor
1120 Processor
1600
1610 Transceiver
1620 Modem

IMAGE PROCESSING DEVICE CONFIGURED TO REGENERATE TIMESTAMP AND ELECTRONIC DEVICE INCLUDING THE SAME

CROSS-REFERENCE TO RELATED APPLICATIONS

This is a continuation of U.S. non-provisional application Ser. No. 18/150,407, filed on Jan. 5, 2023, which is a continuation of U.S. non-provisional application Ser. No. 16/689,579, filed on Nov. 20, 2019, which is a continuation of U.S. non-provisional application Ser. No. 15/914,073, filed on Mar. 7, 2018, which claims the benefit of priority under 35 U.S.C. § 119 to Korean Patent Application Nos. 10-2017-0029687 and 10-2017-0145538 filed on Mar. 8, 2017 and Nov. 2, 2017, respectively, in the Korean Intellectual Property Office, the disclosures of each of which are incorporated by reference herein in their entireties.

BACKGROUND

Various example embodiments of the inventive concepts described herein relate to an image processing device including a vision sensor, an image processing system, an image processing method, and/or non-transitory computer readable medium including instructions related to an image processing method, and more particularly, an image processing device configured to regenerate a timestamp of an event occurring at a bad pixel.

In general, an image sensor may be classified as either an image sensor operating asynchronously or an image sensor operating synchronously. The image sensor operating synchronously is, for example, a complementary metal-oxide-semiconductor (CMOS) image sensor. The image sensor operating asynchronously is, for example, a vision sensor such as a dynamic vision sensor.

The CMOS image sensor processes a frame-based image. For this reason, frames may be generated consistently at regular intervals (or periodically). In this case, since information about a portion that is not of interest to a user (e.g., the background or the like) is also generated consistently at regular intervals, the amount of data that a processor processes may sharply increase. This may cause a reduction in the performance of an image processing device.

In contrast, the vision sensor processes an event-based image. "Event-based" may mean that information about an event (e.g., a change in intensity of light, etc.) is generated and is provided to a user as soon as the event occurs, and data is not generated at regular intervals. Since the change in intensity of light occurs mainly at an outline of an object, unnecessary information (for example, information about a background) is not generated in the vision sensor. Accordingly, the amount of data that a processor processes may sharply decrease.

Meanwhile, a pixel size of the vision sensor is considerably larger than a pixel size of a conventional image sensor such as a CMOS image sensor. In the case where the pixels of the vision sensor themselves are problematic, the yield for a manufacturing process of the vision sensor as well as the quality of an image provided to the user by a vision sensor may be affected. However, since it is limited to improve the yield only through improvement of the manufacturing process of the vision sensor, there is a need to solve an issue due to bad pixels of the vision sensor by using hardware and/or software (e.g., firmware, etc.).

SUMMARY

Various example embodiments of the inventive concepts are directed to an image processing device configured to regenerate a timestamp of an event occurring at a bad pixel.

According to at least one example embodiment, an image processing device may include a vision sensor configured to generate a plurality of events through at least one pixel of a plurality of pixels, and generate a plurality of timestamps associated with times when the plurality of events occur, each of the events corresponding to a change in intensity of light observed by the at least one pixel of the plurality of pixels, the plurality of pixels including a target pixel and adjacent pixels around the target pixel, and at least one processor configured to classify the plurality of events into at least a first group and a second group based on values of the timestamps associated with the events, the events associated with the first group associated with a first timestamp value, and the events associated with the second group associated with a second timestamp value, determine a direction in which the plurality of events occur, determine whether at least one event associated with the target pixel or the adjacent pixels is an abnormal event based on the determined direction and the timestamp values corresponding to the target pixel and the adjacent pixels, the determining including determining whether the at least one event is associated with a third group, the third group having a third timestamp value, and replace the third timestamp with any one of timestamps corresponding to pixels adjacent to a pixel causing the abnormal event.

BRIEF DESCRIPTION OF THE FIGURES

The above and other objects and features of the inventive concepts will become apparent by describing in detail various example embodiments thereof with reference to the accompanying drawings.

FIG. 21 is a block diagram illustrating an electronic device to which the image processing device according to at least one example embodiment of the inventive concepts is applied.

DETAILED DESCRIPTION

Figure 1:
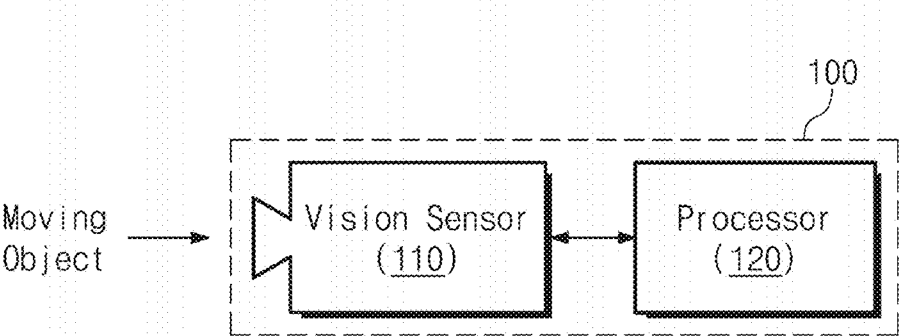
FIG. 1 is a block diagram illustrating an image processing device according to at least one example embodiment of the inventive concepts.

Example embodiments of the inventive concepts will be described in detail hereinafter with reference to the accompanying drawings. Like reference numerals may refer to like elements throughout this application. Example embodiments of the inventive concepts provide a computing system for providing high security and reliability of firmware by using a hardware security module and a firmware managing method thereof.

FIG. 1 is a block diagram illustrating an image processing device 100 according to at least one example embodiment of the inventive concepts. The image processing device 100 may be configured to process a synchronous event as well as an asynchronous event. For example, the image processing device 100 may generate synchronous frames associated with an event, as well as an asynchronous packet associated with an event. The image processing device 100 may include a vision sensor 110 and/or a processor 120, but is not limited thereto.

The vision sensor 110 may sense a change in intensity of light, and in response to the result of the sensing, output an event signal. For example, in the case where the event that the intensity of light increases occurs, the vision sensor 110 may output an "on-event" signal corresponding to the occurrence of the event (e.g., a signal indicating the occurrence of the increased intensity of light). In contrast, in the case where the event that the intensity of light decreases occurs, the vision sensor 110 may output an "off-event," (e.g., a signal indicating the occurrence of the decreased intensity of light).

According to some example embodiments, the vision sensor 110 may be an event-based vision sensor. For example, the vision sensor 110 may access a pixel, at which an intensity change of light is sensed (e.g., a change in the intensity of light, a difference in the intensity of light/differences in the brightness level, etc.), to output an event signal. For example, the intensity change of light may come from the movement of an object (e.g., subject, etc.) photographed by the vision sensor 110, change in the object (and/or subject), for example if the object is an image—a change in the image, and/or movement of the vision sensor 110 itself. In this case, an event signal sensed by the vision sensor 110 and/or output by the vision sensor 110 may be an asynchronous event.

Alternatively or additionally, the vision sensor 110 may be a frame-based vision sensor. For example, the vision sensor 110 may scan all pixels of the vision sensor 110 every reference period (e.g., periodically and/or at desired intervals), to output event signals. However, unlike a general CMOS image sensor, the vision sensor 110 may not output event signals with respect to all pixels and may output event signals only with respect to pixels at which the intensity of light, differences in the intensity of light, and/or change in intensity of light is sensed. In this case, an event signal output from the vision sensor 110 may be converted to a synchronous event signal by the processor 120 or the like.

The processor 120 may process signals sensed by the vision sensor 110. The processor 120 may regenerate a timestamp of pixels of the vision sensor 110, such as a noise pixel, a hot pixel, or a dead pixel, by using a temporal correlation between timestamps of adjacent pixels. A scheme to regenerate a timestamp will be described in detail later.

The processor 120 may include an application specific integrated circuit (ASIC), a field-programmable gate array (FPGA), a dedicated microprocessor, a microprocessor, etc. implemented to execute the scheme to regenerate a timestamp. Alternatively or additionally, the processor 120 may include a general-purpose processor. In this case, the scheme to regenerate a timestamp may be performed by a host processor (e.g., an application processor or the like) connected to the processor 120. Moreover, while a single processor 120 is illustrated in FIG. 1, the example embodiments are not limited thereto, and the processor 120 may be a multi-core processor, a multi-processor system, a distributed computing system, a cloud computing system, etc.

The image processing device 100 of at least one of the example embodiments of the inventive concepts may regenerate a timestamp of an event signal output from a bad pixel (e.g., a noise pixel, a hot pixel, a dead pixel, etc.) among pixels of the vision sensor 110, and thus, the performance of the image processing device 100 may be improved. The bad pixel may be treated by the scheme to be similar to a normal pixel, thereby improving the yield of a pixel array of the vision sensor 110.

Figure 2:
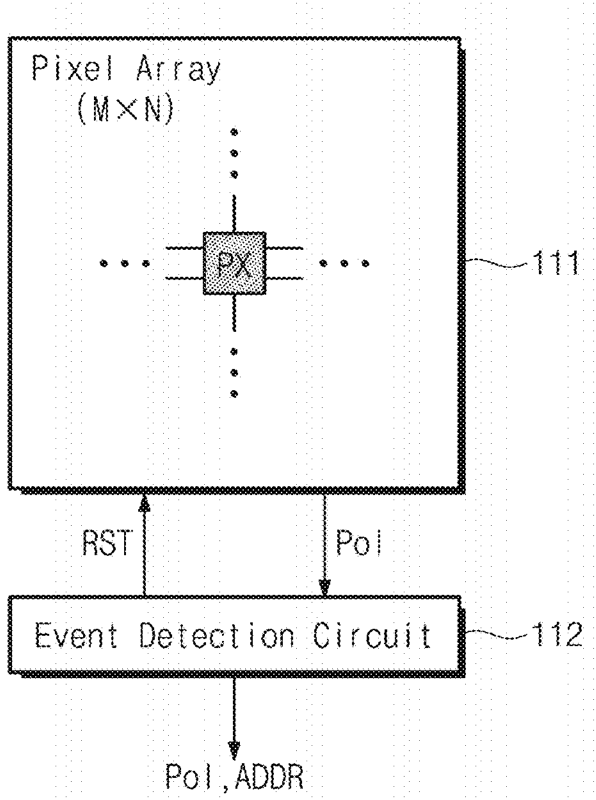
FIG. 2 is a block diagram illustrating a configuration of a vision sensor illustrated in FIG. 1 according to at least one example embodiment.

FIG. 2 is a block diagram illustrating a configuration of the vision sensor 110 illustrated in FIG. 1. Referring to FIG. 2, the vision sensor 110 may include a pixel array 111 and an event detection circuit 112, but the example embodiments are not limited thereto. The event detection circuit 112 may be configured to process events, in which the intensity of light increases or decreases, sensed by the pixel array 111. For example, the event detection circuit 112 may include one or more of various components such as address event representation (AER), a sampler, a packetizer, and/or a scanner, but is not limited thereto. Example configurations of the event detection circuit 112 will be described in detail with reference to FIGS. 3A to 7A.

The pixel array 111 may include a plurality of pixels PX arranged in a matrix form along "M" rows and "N" columns. The pixel array 111 may include a plurality of pixels configured to sense events in which the intensity of light increases or decreases. In other words, each of the plurality of pixels is configured to sense and/or detect whether a change in light occurs (and/or to detect a difference in light observed at the pixel). For example, each pixel may be connected to the event detection circuit 112 through a column line in a column direction and a row line in a row direction. A signal indicating that an event occurs at a pixel may be transmitted by the pixel to the event detection circuit 112, for example, through a column line. Polarity information of an event occurring at each pixel (i.e., information indicating an on-event where the intensity of light increase or an off-event where the intensity of light decreases) may be transmitted to the event detection circuit 112, for example, through a column line.

The event detection circuit 112 may be configured to process the events. For example, the event detection circuit 112 may generate a timestamp including information of a time when an event occurs. For example, the event detection circuit 112 may transmit a reset signal RST to a pixel where an event occurs, such that the pixel is reset. In addition, the event detection circuit 112 may generate a packet or frame including polarity information of an event, an address ADDR of a pixel where the event occurs, a timestamp, etc. The packet or frame generated by the event detection circuit 112 may be processed by the processor 120 (refer to FIG. 1) that is configured to implement a timestamp regeneration scheme to be described in this specification.

According to at least one example configuration, events occurring in the pixel array 111 may be processed in units of pixels, in units of pixel groups each including a plurality of pixels, in units of columns, or in units of frames. However, at least one example embodiment may only mean that events sensed through the pixel array 111 are able to be processed by various methods, and the technical idea to be described through this specification is not limited to only the configurations of the example embodiments discussed herein.

Figure 3A:
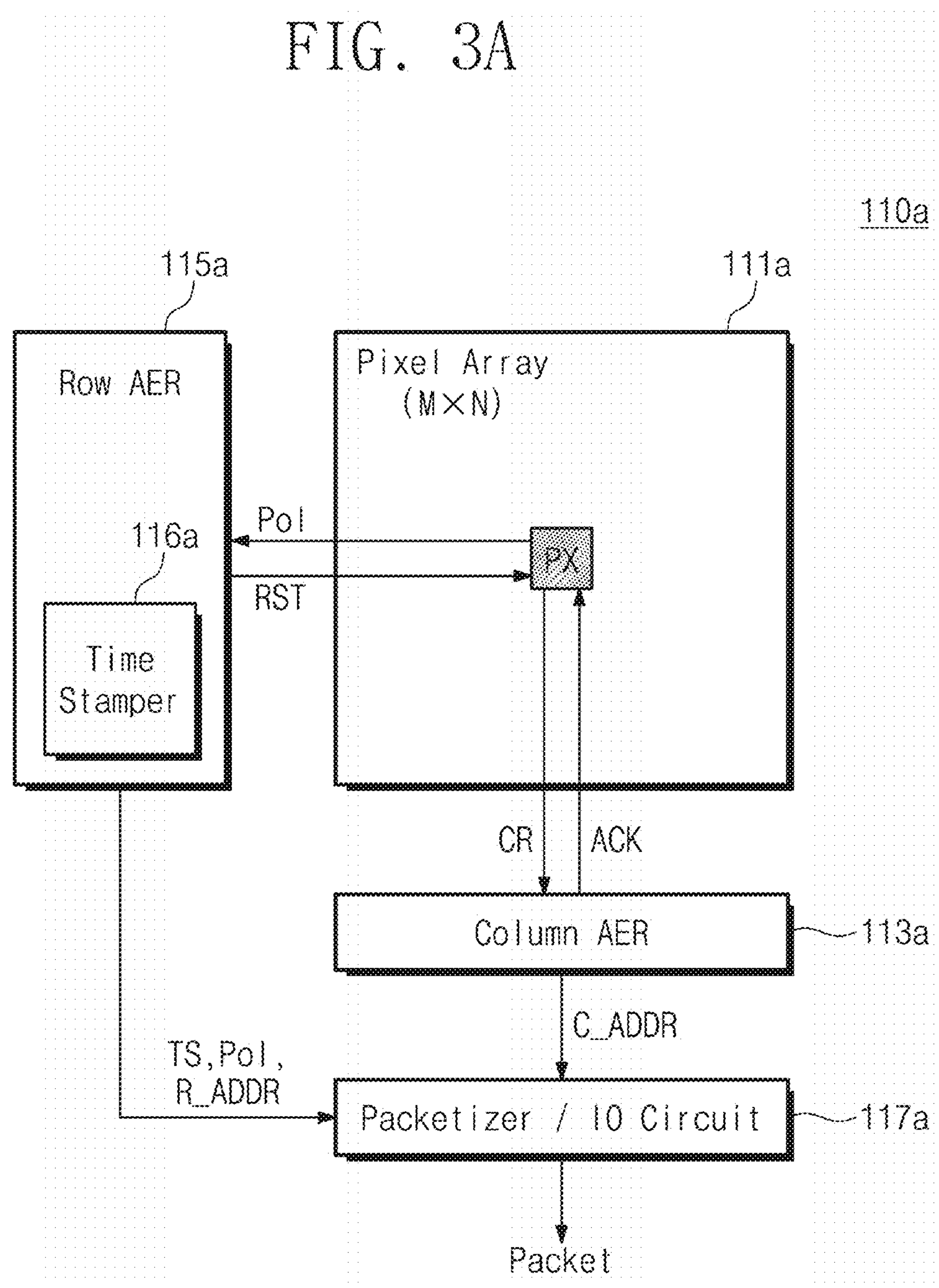
FIG. 3A is a block diagram illustrating an example configuration of the vision sensor illustrated in FIG. 2 according to at least one example embodiment.

FIG. 3A is a block diagram illustrating an example configuration of the vision sensor 110 illustrated in FIG. 2 according to at least one example embodiment. A vision sensor 110*a* may include a pixel array 111*a*, a column AER (address event representation circuit) 113*a*, a row AER 115*a*, and/or a packetizer and input/output (IO) circuit 117*a*, but is not limited thereto.

A pixel, at which an event occurs, from among a plurality of pixels of the pixel array 111*a* may output a column request signal CR indicating that an event where the intensity of light increases or decreases occurs, to the column AER 113*a*.

The column AER 113*a* may transmit an acknowledge signal ACK to the pixel at which the event occurs, in response to the column request signal CR received from the pixel where the event occurs. The pixel that receives the acknowledge signal ACK may output polarity information Pol of the event that occurred to the row AER 115*a*. In addition, the column AER 113*a* may generate a column address C_ADDR of the pixel where the event occurs, based on the column request signal CR received from the pixel where the event occurs.

The row AER 115*a* may receive the polarity information Pol from the pixel where the event occurs. The row AER 115*a* may generate a timestamp TS including information about a time when the event occurs, based on the polarity information Pol. In at least one example embodiment, the timestamp TS may be generated by a timestamper 116*a* (e.g., a timestamper circuit) provided in the row AER 115*a*. For example, the timestamper 116*a* may be implemented by using a timetick generated in units of a few tens of microseconds, but is not limited thereto. The row AER 115*a* may transmit the reset signal RST to the pixel where the event occurs, in response to the polarity information Pol. The reset signal RST may reset the pixel where the event occurs. In addition, the row AER 115*a* may generate a row address R_ADDR of the pixel where the event occurs.

The row AER 115*a* may control a period where the reset signal RST is generated. For example, to reduce and/or prevent a workload from increasing due to the occurrence of a lot and/or a large number of events, AER logic may control the length of a time period where the reset signal RST is generated, such that an event does not occur during a specific and/or desired time period. That is, the AER logic may control a refractory period of occurrence of the event, and therefore, may only allow a single event to be sensed by the pixel during a desired time period.

The packetizer and IO circuit 117*a* may generate a packet based on the timestamp TS, the column address C_ADDR, the row address R_ADDR, and/or the polarity information Pol. The packetizer and IO circuit 117*a* may add a header indicating a start of a packet to the front of the packet and a tail indicating an end of the packet to the rear of the packet.

Figure 3B:
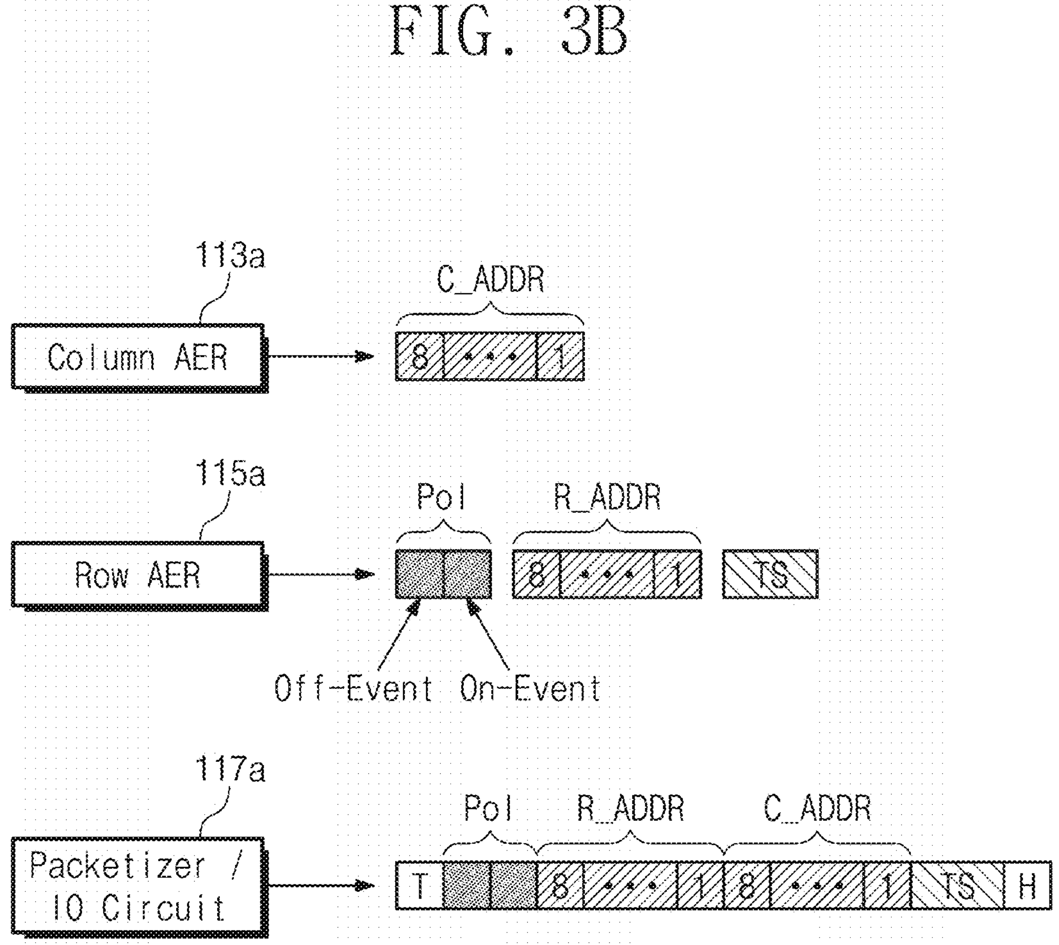
FIG. 3B is a view illustrating a format of information output from a configuration of an example vision sensor illustrated in FIG. 3A according to at least one example embodiment.

FIG. 3B is a view illustrating a format of information output from a configuration of an example vision sensor illustrated in FIG. 3A according to at least one example embodiment. For better understanding, a description will be given together with FIG. 3A.

The timestamp TS may include information about a time when an event occurs. For example, the timestamp TS may be formed of 32 bits, but the example embodiments are not limited thereto and a lesser or greater number of bits may be used for the timestamp format.

Each of the column address C_ADDR and the row address R_ADDR may be formed of 28 bits, respectively. Therefore, there may be provided a vision sensor including a plurality of pixels arranged in a plurality of row, e.g., 28 rows and a plurality of columns, e.g., 28 columns maximally. However, this is only an example, and the number of bits of the column address C_ADDR and the number of bits of the row address R_ADDR may be variously determined according to the number of pixels in the pixel array.

The polarity information Pol may include information about an on-event and/or an off-event. For example, the polarity information Pol may be formed of a first bit including information about whether an on-event occurs and a second bit including information about whether an off-event occurs. For example, an event where both the first bit and the second bit are "1" may not occur, but the event that both the first bit and the second bit are "0" may occur.

A packet output from the packetizer and IO circuit 117*a* may include the timestamp TS, the column address C_ADDR, the row address R_ADDR, and/or the polarity information Pol, but is not limited thereto. Additionally, the arrangement order of the packet is not limited thereto.

Figure 4A:
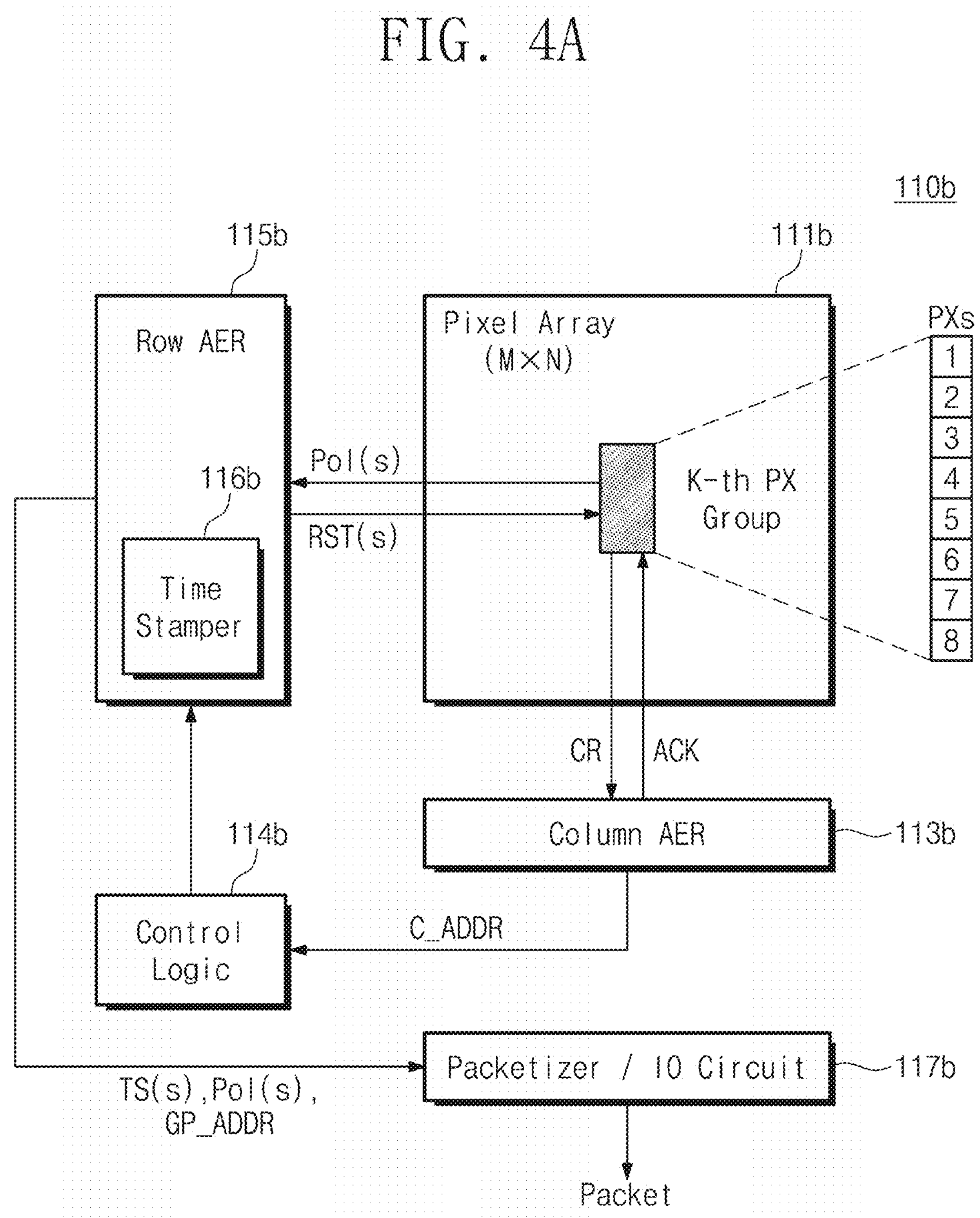
FIG. 4A is a block diagram illustrating an example configuration of the vision sensor illustrated in FIG. 2 according to at least one example embodiment.

FIG. 4A is a block diagram illustrating an example configuration of the vision sensor 110 illustrated in FIG. 2 according to some example embodiments. A vision sensor 110*b* may include a pixel array 111*b*, a column AER 113*b*, a row AER 115*b*, control logic 114*b*, and/or a packetizer and IO circuit 117*b*, but is not limited thereto.

Unlike the example embodiment of FIG. 3A, a plurality of pixels may be divided into a plurality of groups each including at least two or more pixels. In at least one example embodiment, a K-th pixel group including, for example, eight pixels arranged at the same column is illustrated in FIG. 4A. A pixel, at which an event occurs, from among pixels of the K-th pixel group may output the column request signal CR indicating that an event occurs, to the column AER 113*b*.

The column AER 113*b* may transmit an acknowledge signal ACK to the pixel, at which the event occurs, in response to the column request signal CR received from the pixel where the event occurs. The pixels of the K-th pixel group including the pixel that receives the acknowledge signal ACK may output polarity information Pol to the row AER 115*b*. In addition, the column AER 113*b* may generate a column address C_ADDR of the pixel group where the event occurs, based on the column request signal CR received from the pixel where the event occurs.

The control logic 114*b* may transmit the column address C_ADDR to the row AER 115*b*.

The row AER 115*b* may receive pieces of polarity information Pol(s) from one or more pixels of a pixel group including at least one pixel where an event occurs. The row AER 115*b* (in at least one example embodiment, a timestamper 116*b*) may generate timestamps TS(s) including information about a time when one or more events occur, based on the pieces of polarity information Pol(s). The row AER 115*b* may respectively transmit the reset signals RST (s) to the pixels of a pixel group including at least one pixel where an event occurs, in response to the pieces of polarity information Pol(s). The reset signals RST(s) may reset the pixels belonging to the K-th pixel group. The row AER 115*b* may generate a group address GP_ADDR of the K-th pixel group. The row AER 115*b* may control a period where the reset signal RST is generated.

In addition, the row AER 115*b* may generate the group address GP_ADDR of a group including at least one pixel where an event occurs, based on the column address C_ADDR. The correspondence relationship between the group address GP_ADDR of the K-th pixel group and column/row addresses of pixels belonging to the K-th pixel group may be defined in advance, but the example embodiments are not limited thereto, and may be defined in real-time or on demand. For example, a group address of a first pixel group may be defined (e.g., defined in advance, etc.) to indicate addresses of pixels from the first row to the eighth row of the first column. Therefore, in the case of the example embodiment of FIG. 4A where the group address GP_ADDR is used, a separate column address or a separate row address may not be included in a packet.

The packetizer and IO circuit 117*b* may generate a packet based on the timestamps TS(s), the column address C_ADDR, the group address GP_ADDR, and/or the pieces of polarity information Pol(s), but is not limited thereto.

Figure 4B:
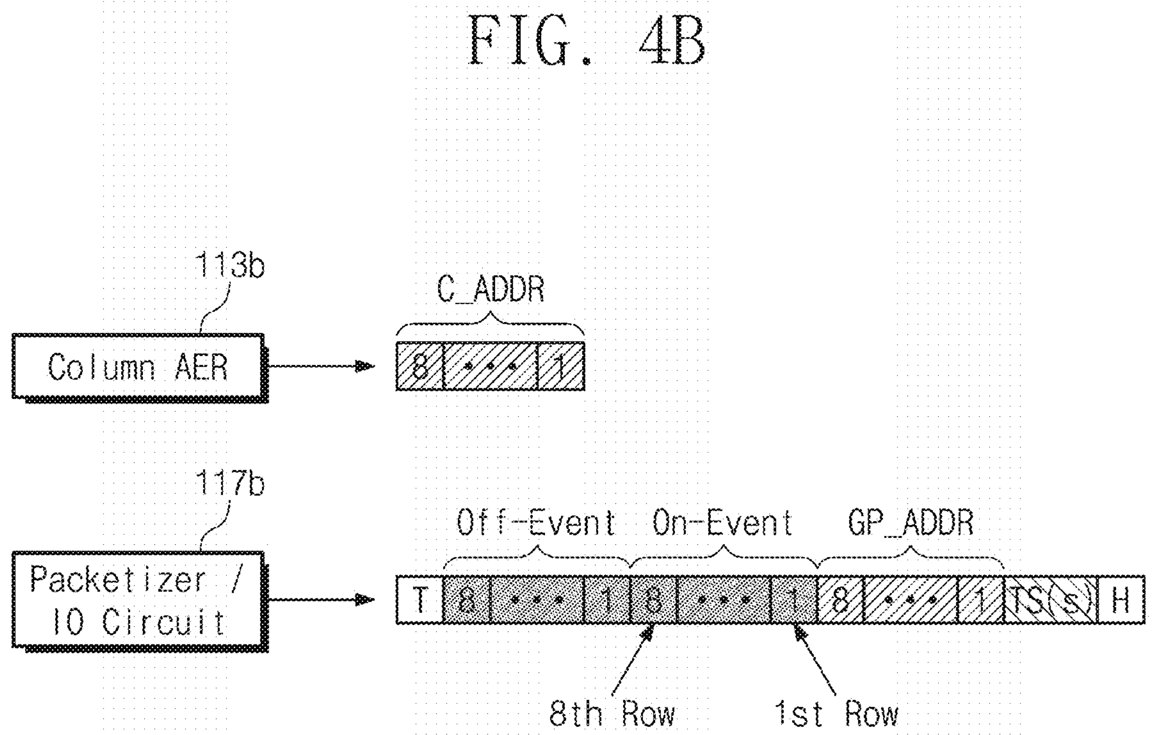
FIG. 4B is a view illustrating a format of information output from a configuration of an example vision sensor illustrated in FIG. 4A according to at least one example embodiment.

FIG. 4B is a view illustrating a format of information output from a configuration of an example vision sensor illustrated in FIG. 4A according to at least one example embodiment. For better understanding, a description will be given together with FIG. 4A.

A packet output from the packetizer and IO circuit 117*b* may include the timestamps TS(s), the group address GP_ADDR, on-event information, and/or off-event information, but is not limited thereto. Additionally, the arrangement order is not limited thereto. The on-event information and the off-event information may be called "polarity information" (e.g., polarity information related to the subject of the image captured by the vision sensor).

The timestamps TS(s) may include time information of an event that has occurred at each pixel belonging to the K-th pixel group. The group address GP_ADDR may indicate a unique address of a pixel group including a pixel where an event occurs. In at least one example embodiment, the group address GP_ADDR is illustrated as being formed of 8 bits. However, the example embodiments of the inventive concepts are not be limited thereto. That is, the number of bits of the group address GP_ADDR may vary based on the number of pixels of the pixel array 111*b*.

For example, each of the on-event information and the off-event information may be formed of 8 bits. A first bit among bits indicating an on-event may indicate event information of a first pixel (e.g., a pixel marked by a "1" value among pixels of FIG. 4A) belonging to the K-th group. As in the above description, an eighth bit among the bits indicating the on-event may indicate event information of an eighth pixel (e.g., a pixel marked by "8" among pixels of FIG. 4A) belonging to the K-th group. The off-event is similar to the above-described on-event, with the off-event represented by a "0" value. However, the example embodiments are not limited thereto and the on-event may be marked by a "0" value and the off-event may be marked by a "1" value, etc.

Figure 5A:
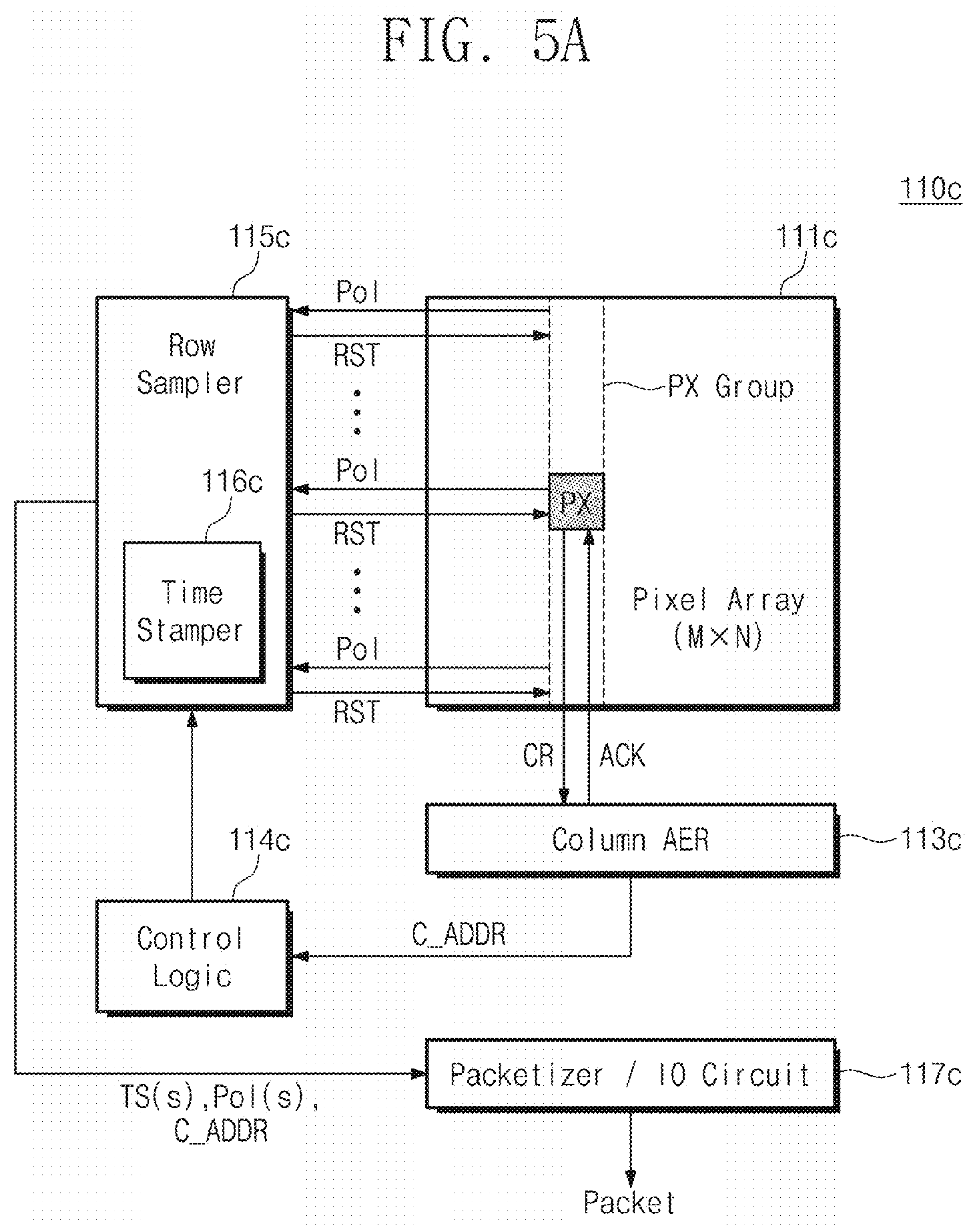
FIG. 5A is a block diagram illustrating an example configuration of the vision sensor illustrated in FIG. 2 according to at least one example embodiment.

FIG. 5A is a block diagram illustrating an example configuration of the vision sensor 110 illustrated in FIG. 2 according to at least one example embodiment. A vision sensor 110*c* may include a pixel array 111*c*, a column AER 113*c*, control logic 114*c*, a row sampler 115*c*, and/or a packetizer and IO circuit 117*c*, but is not limited thereto.

Unlike the example embodiment of FIG. 3A, a plurality of pixels may be grouped in units of columns. For example, a pixel where an event occurs may output the column request signal CR indicating that an event occurs, to the column AER 113*c*.

The column AER 113*c* may transmit an acknowledge signal ACK to the pixel at which the event occurs, in response to the column request signal CR received from the pixel where the event occurs. Each of the pixels arranged at the same column as the column to which the pixel receiving the acknowledge signal ACK belongs may output polarity information Pol to the row sampler 115*c*. In addition, the column AER 113*c* may generate the column address C_ADDR of the column to which the pixel where the event occurs belongs, based on the column request signal CR received from the pixel where the event occurs.

The control logic 114*c* may request the row sampler 115*c* to perform sampling on the pixels arranged at the same column as the pixel where an event occurs. The control logic 114*c* may transmit the column address C_ADDR.

The row sampler 115*c* may receive pieces of polarity information Pol(s) from the pixels arranged at the same column as the pixel where an event occurs. The row sampler 115*c* (in at least one example embodiment, a timestamper 116*c*) may generate timestamps TS(s) including information about a time when the one or more events occur, based on the pieces of polarity information Pol(s). The row sampler 115*c* may respectively transmit the reset signals RST(s) to the pixels arranged at the same column as the pixel where an event occurs, in response to the pieces of polarity information Pol(s). The reset signals RST(s) may reset the pixels arranged at the same column as the pixel where an event occurs. The row sampler 115*c* may control a period where the reset signal RST is generated.

Figure 5B:
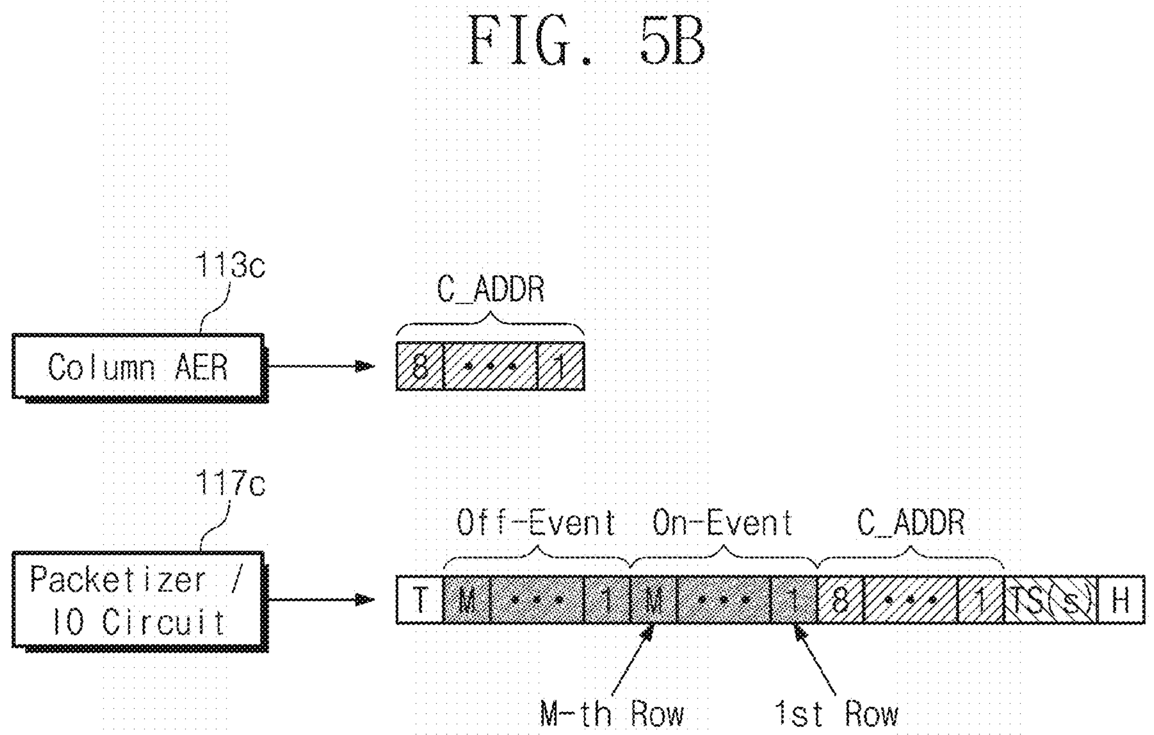
FIG. 5B is a view illustrating a format of information output from a configuration of an example vision sensor illustrated in FIG. 5A according to at least one example embodiment.

FIG. 5B is a view illustrating a format of information output from a configuration of an example vision sensor illustrated in FIG. 5A according to at least one example embodiment. For better understanding, a description will be given together with FIG. 5A.

A packet output from the packetizer and IO circuit 117*c* may include the timestamps TS(s), the column address C_ADDR, on-event information, and/or off-event information, but is not limited thereto. Additionally, the arrangement order of the packet is not limited thereto.

Each of the on-event information and the off-event information may be formed of M bits. For example, a first bit among a plurality of bits indicating an on-event may indicate event information of a pixel, which corresponds to the first row, from among a plurality of pixels arranged at the same column as the pixel where an event occurs. As in the above description, an M-th bit among bits indicating the on-event may indicate event information of a pixel, which corresponds to the M-th row, from among the plurality of pixels arranged at the same column as the pixel where an event occurs. The off-event is similar to the above-described on-event.

Figure 6A:
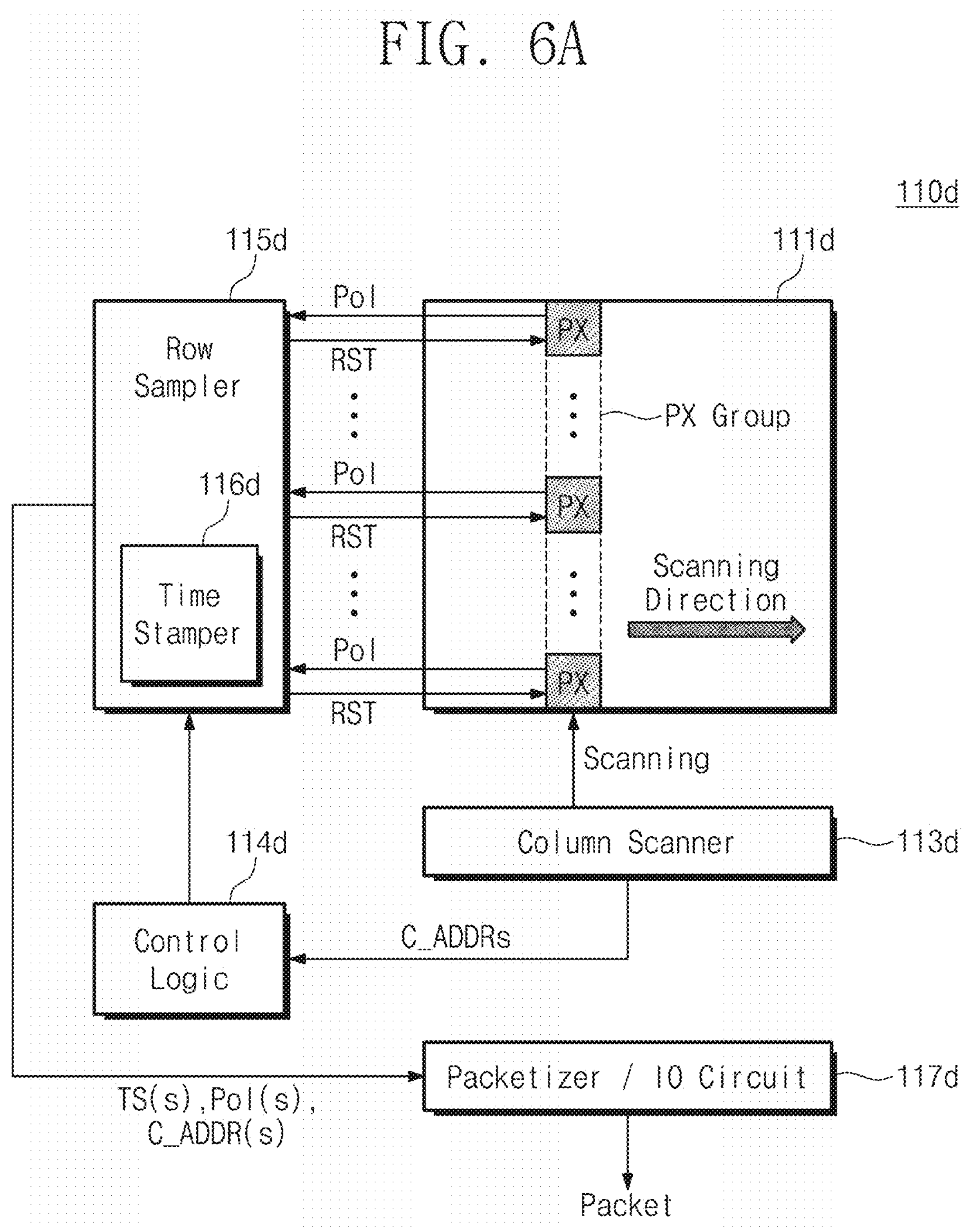
FIG. 6A is a block diagram illustrating an example configuration of the vision sensor illustrated in FIG. 2 according to at least one example embodiment.

FIG. 6A is a block diagram illustrating an example configuration of the vision sensor 110 illustrated in FIG. 2 according to at least one example embodiment. A vision sensor 110*d* may include a pixel array 111*d*, a column scanner 113*d*, control logic 114*d*, a row sampler 115*d*, and/or a packetizer and IO circuit 117*d*, but is not limited thereto.

Unlike the above-described example embodiments, a pixel where an event occurs may not output a signal (e.g., a column request signal) indicating that an event occurs, to the column scanner 113*d*. Unlike the above-described example embodiments, pixels may not be grouped in this example embodiment.

The column scanner 113*d* may scan the pixel array 111*d* from the first column to the N-th column sequentially and/or periodically. The column scanner 113*d* may generate the column address C_ADDR of a column to be scanned and may transmit the column address C_ADDR to the control logic 114*d*.

The control logic 114*d* may request the row sampler 115*d* to perform sampling on pixels arranged at a column scanned by the column scanner 113*d*. In addition, the control logic 114*d* may transmit the column address C_ADDR of the column to be scanned to the row sampler 115*d*.

The row sampler 115*d* may receive pieces of polarity information Pol(s) from the pixels arranged at the scanned column. The row sampler 115*d* (in at least one example embodiment, a timestamper 116*d*) may generate timestamps TS(s) including information about a time when one or more events occur, based on the pieces of polarity information Pol(s). The row sampler 115*d* may respectively transmit the reset signals RST(s) to the pixels arranged at the scanned column in response to the pieces of polarity information Pol(s). The reset signals RST(s) may reset the pixels arranged at the scanned column. The row sampler 115*d* may control a period where the reset signal RST is generated.

Figure 6B:
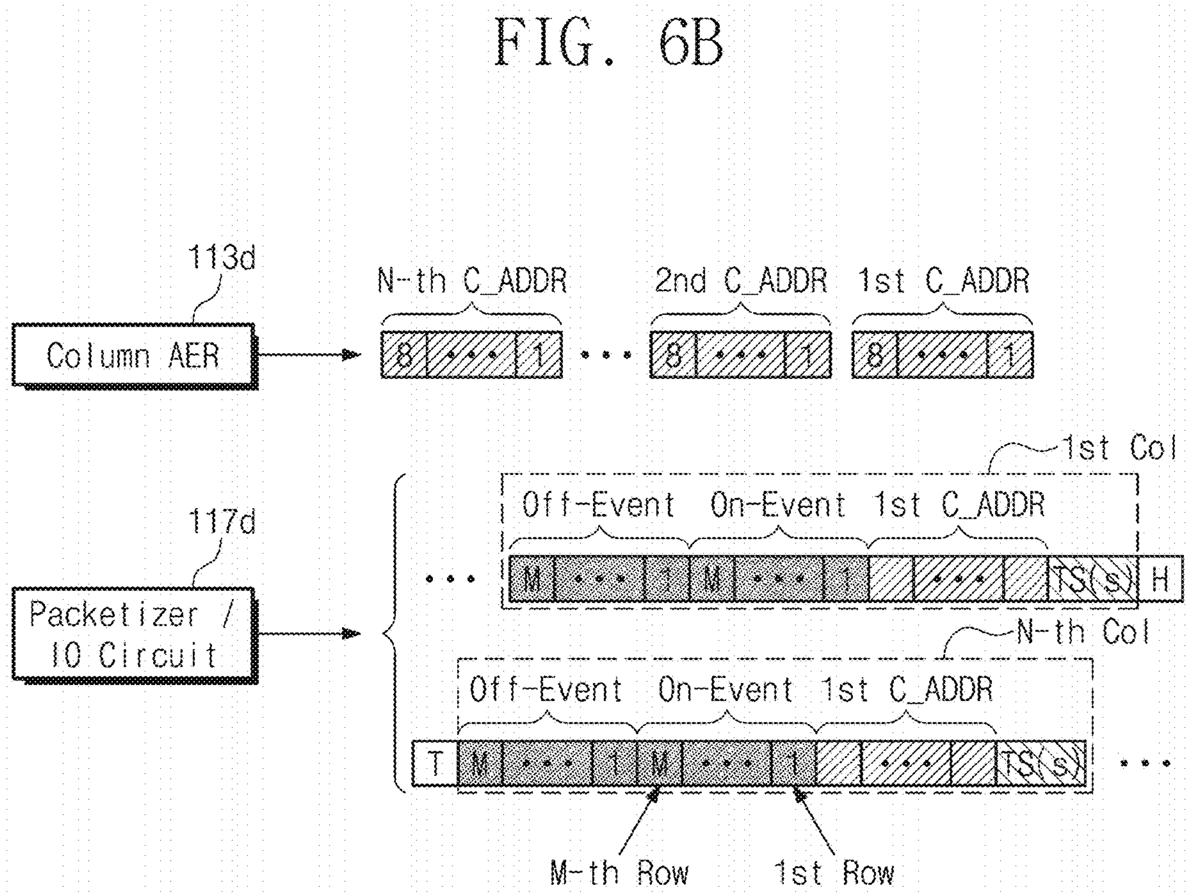
FIG. 6B is a view illustrating a format of information output from a configuration of an example vision sensor illustrated in FIG. 6A according to at least one example embodiment.

FIG. 6B is a view illustrating a format of information output from a configuration of an example vision sensor illustrated in FIG. 6A according to at least one example embodiment. For better understanding, a description will be given together with FIG. 6A.

A packet output from the packetizer and IO circuit 117*d* may include information about all events that occurred in the pixel array 111*d*. For example, the packet may include information about the first column to information about the N-th column. For brevity of illustration, the information about the first column and information about the N-th column of the packet output from the packetizer and IO circuit 117*d* are illustrated in FIG. 6B.

A portion of the packet, which is associated with the first column, may include the timestamps TS(s), a first column address 1st C_ADDR, on-event information, and/or off-event information, but is not limited thereto. Additionally, the arrangement order of the packet is not limited thereto.

The timestamp(s) TS(s) may include time information of events that occurred at the first column. Each of the on-event information and the off-event information may be formed of M bits. For example, a first bit among bits indicating an on-event may indicate event information of a pixel at the first row and first column. As in the above description, an M-th bit among the bits indicating the on-event may indicate event information of a pixel at the M-th row and first column. The off-event is similar to the above-described on-event.

The above-described configuration may be equally applied to a portion of the packet corresponding to the second column to a portion of the packet corresponding to the N-th column. Thus, a detailed description thereof will not be repeated here.

Figure 7A:
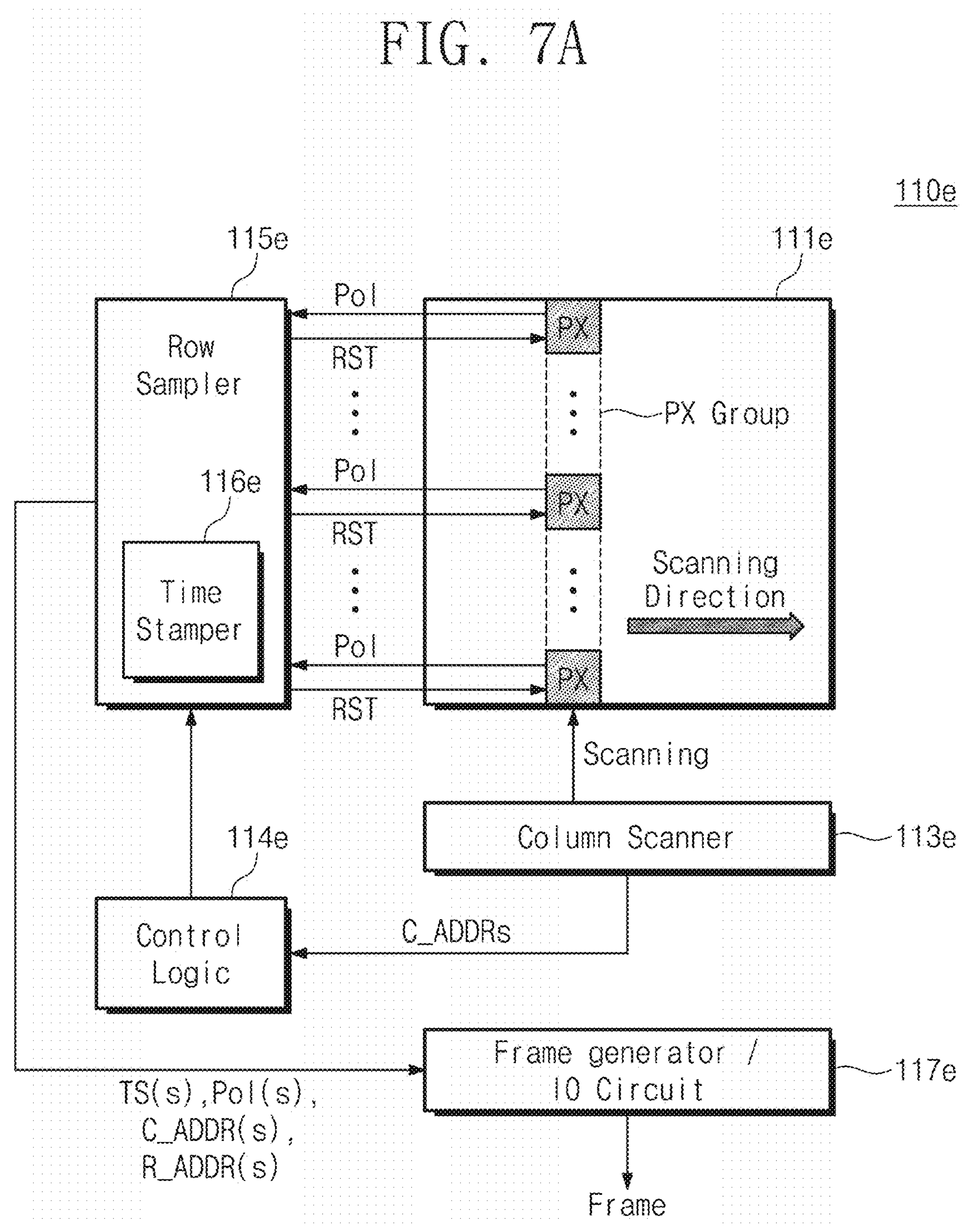
FIG. 7A is a block diagram illustrating an example configuration of the vision sensor illustrated in FIG. 2 according to at least one example embodiment.
Figure 7B:
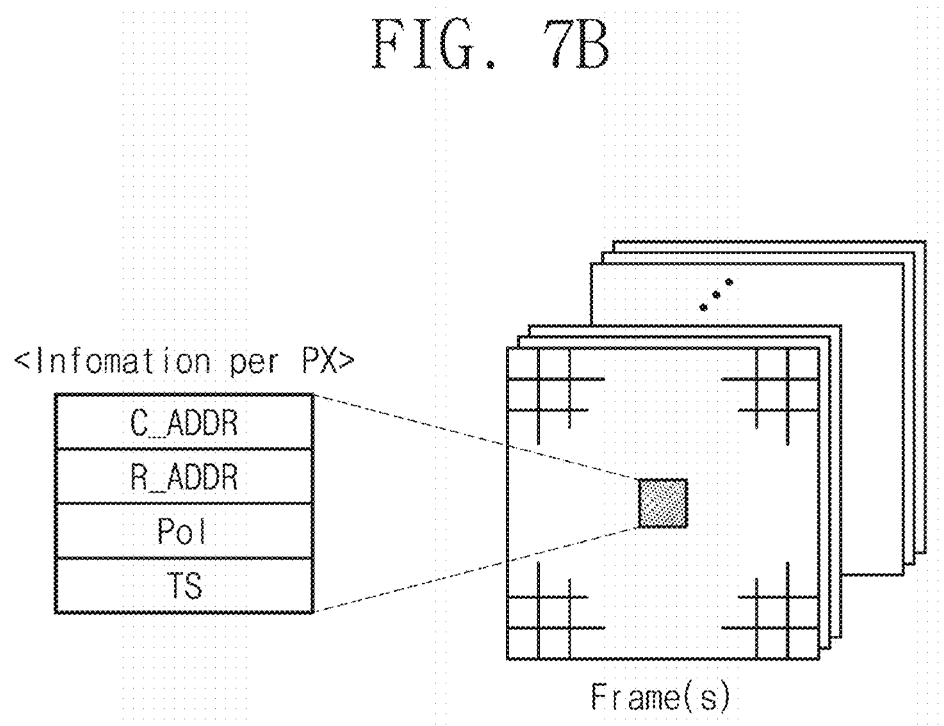
FIG. 7B is a view illustrating an example format of a frame output from a vision sensor of FIG. 7A according to at least one example embodiment.

FIG. 7A is a block diagram illustrating an example configuration of the vision sensor 110 illustrated in FIG. 2 according to at least one example embodiment. FIG. 7B is a view illustrating an example format of a frame output from a vision sensor of FIG. 7A according to at least one example embodiment.

A vision sensor 110*e* may include a pixel array 111*e*, a column scanner 113*e*, control logic 114*e*, a row sampler 115*e*, and/or a frame generator and IO circuit 117*e*, but is not limited thereto. A configuration and an operation of the vision sensor 110*e* is similar to those of a vision sensor described with reference to FIG. 6A, and thus, a duplicated description thereof will not be repeated here. However, the vision sensor 110*e* may be configured to generate a frame in a synchronous manner instead of generating a packet in an asynchronous manner according to at least one example embodiment.

For example, the frame generator and IO circuit 117*e* may generate a frame by using timestamps TS(s), column addresses C_ADDR(s), row addresses R_ADDR(s), and/or pieces of polarity information Pol(s) periodically obtained by the column scanner 113*e* and the row sampler 115*e*.

For example, in the case where the column scanner 113*e* scans the pixel array 111*e* at a regular period (e.g., periodically and/or at a desired interval), frames may be periodically generated by the frame generator and IO circuit 117*e*. Therefore, the vision sensor 110*e* may operate in a synchronous manner. In at least one example embodiment, in the case where the vision sensor 110*e* operates in a synchronous manner, the row sampler 115*e* may control a period where the reset signal RST is generated. For example, if a frame rate is 60 frames/see, a period to generate the reset signal RST may be 1/60 seconds.

However, the frame-based vision sensor 110*e* may not always operate in the synchronous manner. For example, the amount of events that have occurred (e.g., the number of events that have occurred) may vary at all times. For example, any frame may include a very small amount and/or number of events, while another event may include a significant amount and/or number of events. For example, if the amount of events occurred is small, the speed for generating a frame based on the output of the vision sensor 110*e* may become higher due to a decrease in the period for generating the reset signal RST. In contrast, if the amount of events occurred is great, the speed for generating a frame may become lower due to an increase in the period for generating the reset signal RST. In this case, since a period to generate a frame changes frequently, frames may be output in an asynchronous manner.

Some examples of the event detection circuit 112 illustrated in FIG. 2 are described with reference to FIGS. 3A to 7A. However, the example embodiments may only mean that events sensed through a pixel array are able to be processed by various methods, and the technical idea to be described through this specification is not limited to the configurations of the example embodiments discussed.

Figure 8:
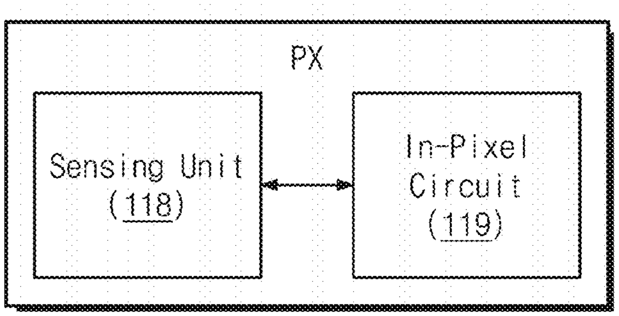
FIG. 8 is a block diagram illustrating a configuration of a pixel illustrated in FIGS. 3A to 7B according to at least one example embodiment.

FIG. 8 is a block diagram illustrating a configuration of a pixel illustrated in FIGS. 3A to 7B according to some example embodiments. A pixel PX may include a sensing unit 118 and/or an in-pixel circuit 119, but is not limited thereto. In any example embodiment, the sensing unit 118 may be called a "function block" to sense a change of light. The in-pixel circuit 119 may be called a "function block" to process the sensed change of the light as an analog signal or a digital signal. For example, the in-pixel circuit 119 may be implemented with an analog circuit, a digital circuit, or a combinations thereof.

Figure 9:
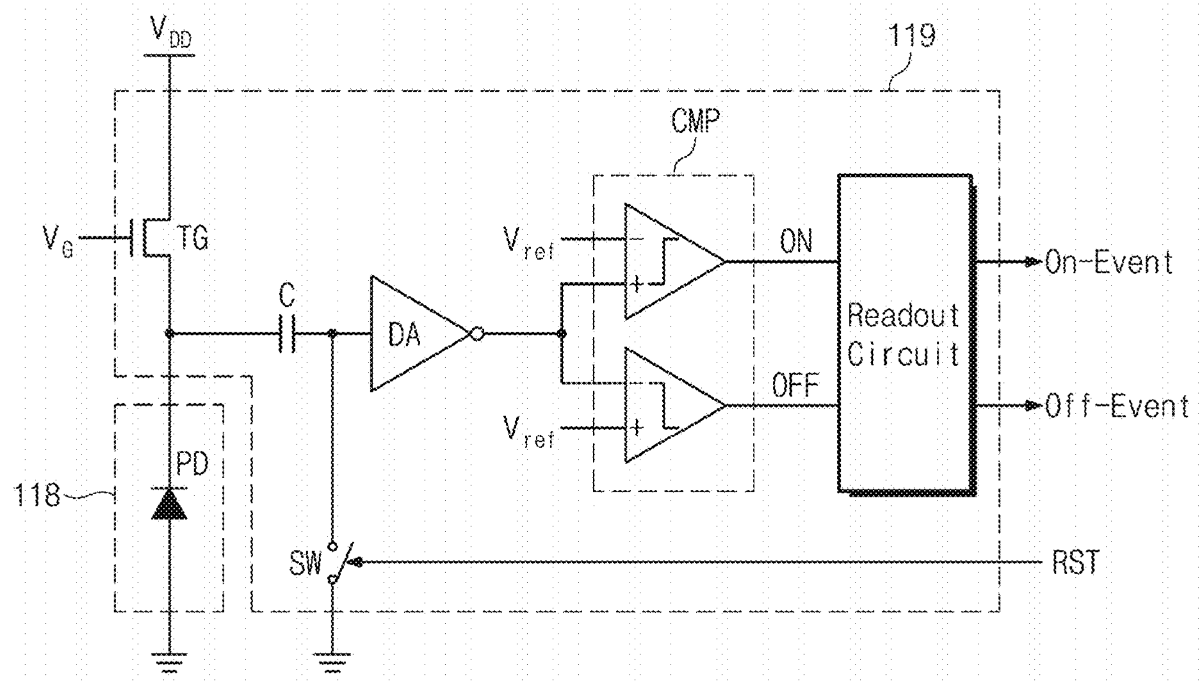
FIG. 9 is a circuit diagram illustrating a configuration of a pixel illustrated in FIG. 8 according to at least one example embodiment.

FIG. 9 is a circuit diagram illustrating a configuration of a pixel illustrated in FIG. 8 according to at least one example embodiment. A pixel may include the sensing unit 118 and/or the in-pixel circuit 119, but is not limited thereto.

The sensing unit 118 may include a photodiode PD. The photodiode PD may convert light energy to electrical energy. That is, since the electrical energy varies depending on an intensity change of light (e.g., change in the intensity of light), whether an event occurs may be determined by sensing the electrical energy varying (e.g., sensing the energy differential).

The in-pixel circuit 119 may include a capacitor "C", a differential amplifier DA, a comparator CMP, and/or a readout circuit, but is not limited thereto. The in-pixel circuit 119 may further include a transfer gate transistor TG for supplying power and a switch SW for resetting the pixel after one event is completely processed.

The capacitor "C" may store electrical energy generated by the photodiode PD. For example, the capacitance of the capacitor "C" may be appropriately selected in consideration of the shortest time (e.g., a refractory period) between two events that occur consecutively at one pixel.

If the switch SW is turned on by the reset signal RST, charges stored in the capacitor "C" may be discharged, and thus, the pixel may be reset. For example, the reset signal RST may be received from the row AER (refer to FIGS. 3A and 4A) or the row sampler (refer to FIGS. 5A, 6A, and 7A) described with reference to FIGS. 3A to 7A.

The differential amplifier DA may amplify a voltage level corresponding to charges stored in the photodiode PD. This makes it easy for the comparator CMP to determine a type of an event.

The comparator CMP may compare a level of an output voltage of the differential amplifier DA and a level of a reference voltage Vref, to determine whether an event occurred at the pixel is an on-event or an off-event. For example, in the case where the intensity of light increases, the comparator CMP may output a signal ON indicating an on-event. In contrast, in the case where the intensity of light decreases, the comparator CMP may output a signal OFF indicating an off-event.

The readout circuit may transmit information about an event that occurred at the pixel (i.e., information indicating whether the event is an on-event or an off-event). The on-event information or the off-event information, which are called "polarity information", may be transmitted to the row AER (refer to FIGS. 3A and 4A) or the row sampler (refer to FIGS. 5A, 6A, and 7A) described with reference to FIGS. 3A to 7A.

A configuration of the pixel illustrated in FIG. 9 may be an example. That is, a configuration (e.g., a photodiode) to sense a change of light, a configuration (e.g., "C") to store electrical energy, a configuration (e.g., CMP) to determine a type of an event occurred from the stored electrical energy, and a configuration (e.g., the readout circuit) to generate the most basic information about an event are illustrated in FIG. 9. However, the pixels of various configurations to sense a change in intensity of light and determine a type of an event based on the sensing result may be applied to the inventive concepts.

Figure 10A:
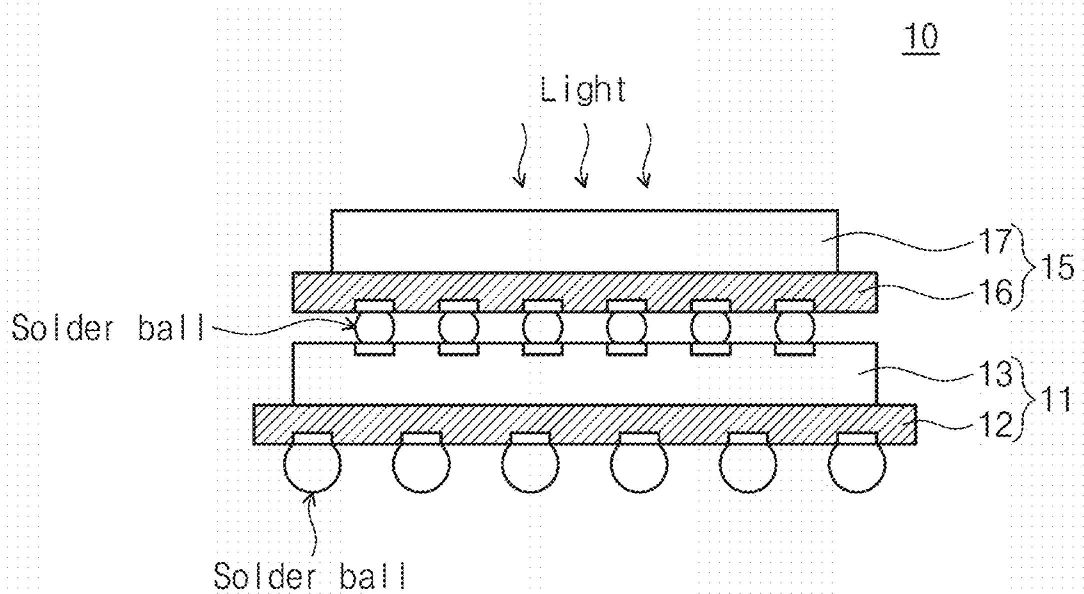
FIG. 10A is a sectional view illustrating a semiconductor package of the image processing device described with reference to FIGS. 1 to 9 according to at least one example embodiment.

FIG. 10A is a sectional view illustrating a semiconductor package of an image processing device described with reference to FIGS. 1 to 9 according to some example embodiments. Referring to FIG. 10A, a semiconductor package 10 may include a lower package 11 and/or an upper package 15, but is not limited thereto.

The lower package 11 may include a lower substrate 12 and/or a lower semiconductor chip 13, but is not limited thereto. For example, the lower semiconductor chip 13 may include the remaining components (e.g., 113*a*, 115*a*, and 117*a*/113*b*, 114*b*, 115*b*, and 117*b*/113*c*, 114*c*, 115*c*, and 117*c*/113*d*, 114*d*, 115*d*, and 117*d*/113*e*, 114*e*, 115*e*, and 117*e*) of the vision sensor 110*a*/110*b*/110*c*/110*d*/110*e* described with reference to FIG. 3A, 4A, 5A, 6A, or 7A other than a pixel array and the in-pixel circuit 119 of FIG.

9. The lower package 11 may be a flip chip component, in which the lower semiconductor chip 13 is mounted on the lower substrate 12 in a face down manner.

The lower substrate 12 may be a printed circuit board (PCB) having a circuit pattern. External terminals provided on a lower surface of the lower substrate 12 may electrically connect an upper semiconductor chip 17 and/or the lower semiconductor chip 13 with an external electronic device (not illustrated). For example, the upper semiconductor chip 17 and the external terminals may be electrically connected to each other through internal wires and/or through silicon vias (TSVs). For example, in the case where the TSVs are used, an upper substrate 16 on which the upper semiconductor chip 17 is mounted may be omitted.

The lower semiconductor chip 13 may be mounted on the lower substrate 12. The lower semiconductor chip 13 may be encapsulated by a molding layer (not illustrated). The molding layer may include an insulating polymer material, such as epoxy molding compound, etc.

The upper package 15 may include an upper substrate 16 and/or the upper semiconductor chip 17, but is not limited thereto. For example, the upper semiconductor chip 17 may include the sensing unit 118 of FIG. 3. That is, the upper semiconductor chip 17 may be formed of a component (e.g., a photodiode) to sense a change of light of the pixel array 111 of FIG. 2.

The upper substrate 16 may be a PCB having a circuit pattern. The upper semiconductor chip 17 may be encapsulated by a molding layer (not illustrated).

Figure 10B:
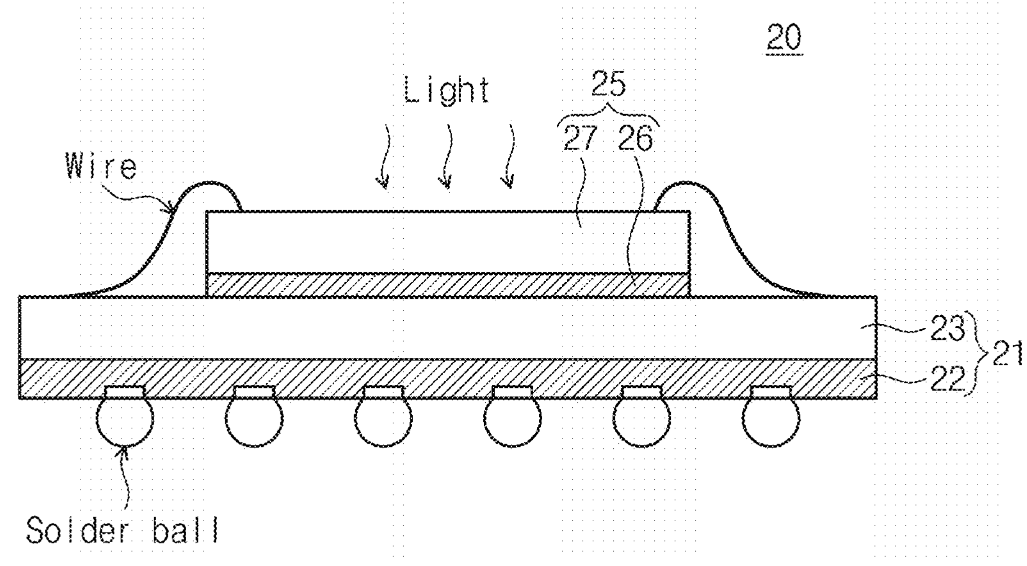
FIG. 10B is a sectional view illustrating a semiconductor package of the image processing device described with reference to FIGS. 1 to 9 according to at least one example embodiment.

FIG. 10B is a sectional view illustrating a semiconductor package of an image processing device described with reference to FIGS. 1 to 9 according to some example embodiments. Referring to FIG. 10B, a semiconductor package 20 may include a lower package 21 and/or an upper package 25, but is not limited thereto. The lower package 21 may include a lower substrate 22 and/or a lower semiconductor chip 23, but is not limited thereto. The upper package 25 may include an upper substrate 26 and/or an upper semiconductor chip 27, but is not limited thereto. The semiconductor package 20 of FIG. 10B is similar to the semiconductor package 10 of FIG. 10A except that the semiconductor package 20 is packaged in a wire bonding manner. Thus, a detailed description thereof will not be repeated here.

Figure 10C:
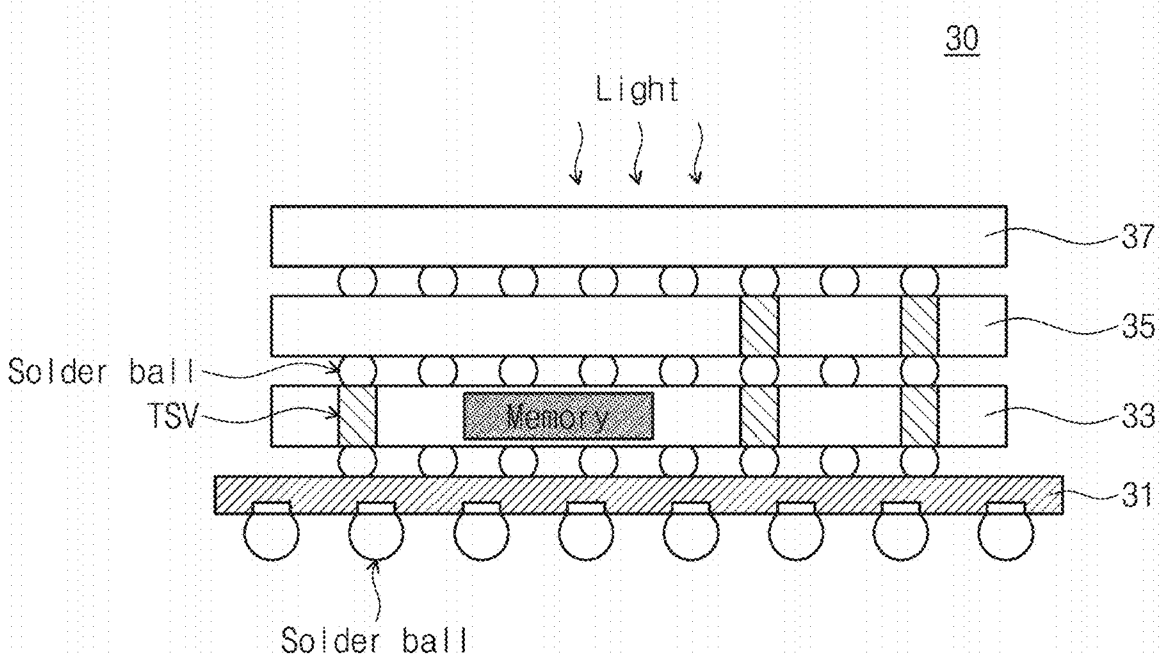
FIG. 10C is a sectional view illustrating a semiconductor package of the image processing device described with reference to FIGS. 1 to 9 according to at least one example embodiment.

FIG. 10C is a sectional view illustrating a semiconductor package of an image processing device described with reference to FIGS. 1 to 9 according to some example embodiments. Referring to FIG. 10C, a semiconductor package 30 may include a package substrate 31, a first semiconductor chip 33, a second semiconductor chip 35, and/or a third semiconductor chip 37, but is not limited thereto. The semiconductor package 30 of FIG. 10C is similar to the semiconductor package 10 of FIG. 10A except that a semiconductor chip including a memory device is further packaged. Thus, a detailed description thereof will not be repeated here.

The first semiconductor chip 33 may include a memory. Data needed for an image processing device of at least one example embodiment of the inventive concepts to operate may be stored in a memory implemented with the first semiconductor chip 33. For example, data that the image processing device processes may be stored in the memory implemented with the first semiconductor chip 33. For example, the first semiconductor chip 33 may include a volatile memory, such as a dynamic random access memory (DRAM), a synchronous DRAM (SDRAM), or the like and/or a nonvolatile memory, such as a phase-change RAM (PRAM), a magneto-resistive RAM (MRAM), a resistive RAM (ReRAM), a ferroelectric RAM (FRAM), or the like.

The second semiconductor chip 35 may include the remaining components (e.g., 113*a*, 115*a*, and 117*a*/113*b*, 114*b*, 115*b*, and 117*b*/113*c*, 114*c*, 115*c*, and 117*c*/113*d*, 114*d*, 115*d*, and 117*d*/113*e*, 114*e*, 115*e*, and 117*e*) of the vision sensor 110*a*/110*b*/110*c*/110*d*/110*e* described with reference to FIG. 3A, 4A, 5A, 6A, or 7A other than a pixel array and the in-pixel circuit 119 of FIG. 9. The third semiconductor chip 37 may include the pixel array 111*a*/111*b*/111*c*/111*d*/111*e* among components of the vision sensor 110*a*/110*b*/110*c*/110*d*/110*e* described with reference to FIG. 3A, 4A, 5A, 6A, or 7A.

Figure 10D:
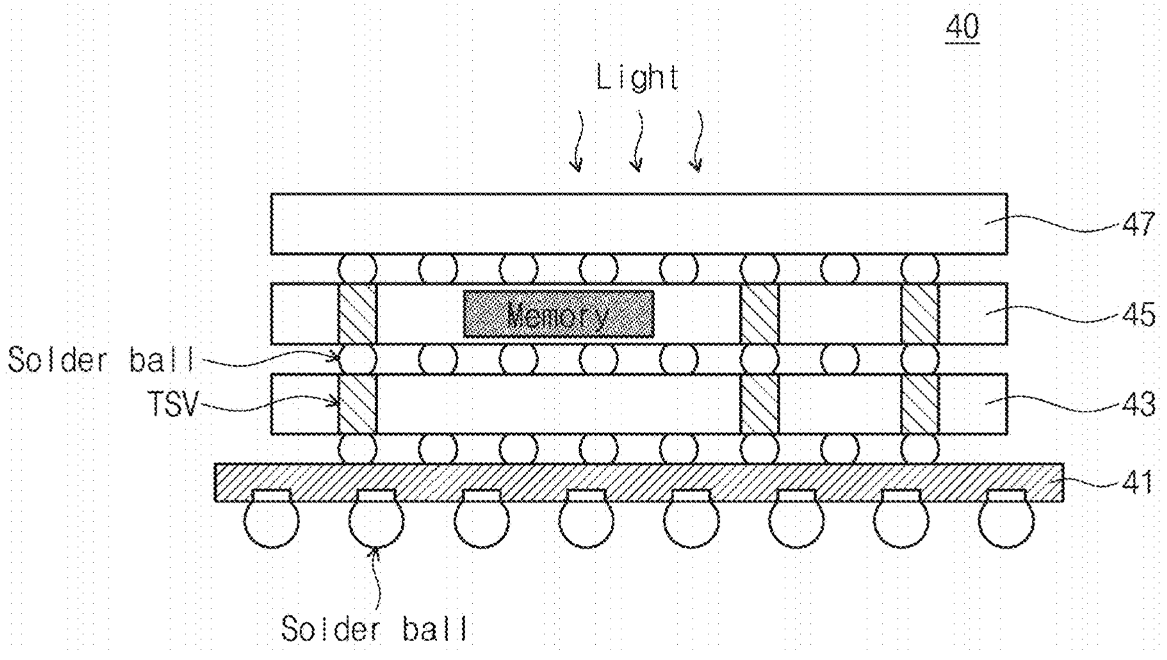
FIG. 10D is a sectional view illustrating a semiconductor package of the image processing device described with reference to FIGS. 1 to 9 according to at least one example embodiment.

FIG. 10D is a sectional view illustrating a semiconductor package of an image processing device described with reference to FIGS. 1 to 9 according to some example embodiments. Referring to FIG. 10D, a semiconductor package 40 may include a package substrate 41, a first semiconductor chip 43, a second semiconductor chip 45, and/or a third semiconductor chip 47, but is not limited thereto. For example, the first semiconductor chip 43, the second semiconductor chip 45, and the third semiconductor chip 47 may respectively correspond to the second semiconductor chip 35, the first semiconductor chip 33, and the third semiconductor chip 37 illustrated in FIG. 10C. That is, the semiconductor package 40 of FIG. 10D may be similar to the semiconductor package 30 of FIG. 10C except for an order of semiconductor chips stacked. Thus, a description thereof will not be repeated here.

Figure 11:
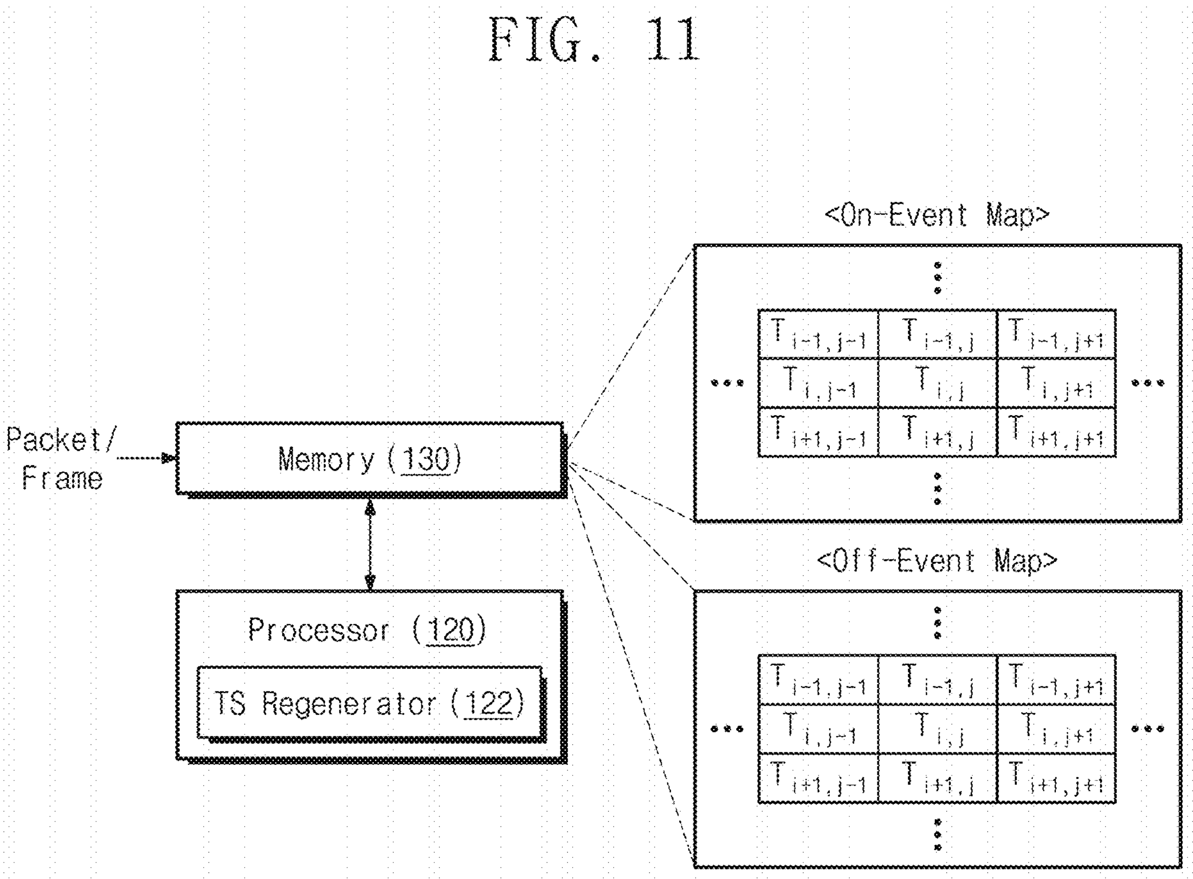
FIG. 11 is a block diagram illustrating an operation of a processor illustrated in FIG. 1 according to at least one example embodiment.

FIG. 11 is a block diagram illustrating an operation of the processor 120 illustrated in FIG. 1 according to at least one example embodiment. The processor 120 is illustrated together with a memory 130. For example, the memory 130 may be a memory implemented with the first semiconductor chip 33 or the second semiconductor chip 45 illustrated in FIG. 10C or 10D, but is not limited thereto. Alternatively or additionally, the memory 130 may be a buffer or a cache memory provided together with the processor 120. The processor 120 may include a timestamp regenerator 122, etc. Additionally, the processor 120 may be a multi-core processor, a multi-processor system, a distributed processing system, a cloud processing system, etc. For better understanding, a description will be given with reference to FIGS. 1 to 9.

The memory 130 may store a packet or a frame received from the vision sensor 110. For example, as described with reference to FIGS. 3B to 7B, the packet or frame may include a part of the timestamp TS, the column address C_ADDR, the row address R_ADDR, the group address GP_ADDR, and/or the polarity information Pol including the on-event information and the off-event information, etc.

The processor 120 may generate an on-event map and an off-event map based on the timestamp TS, the address ADDR, and the polarity information Pol. The on-event map and the off-event map may be stored in the memory 130. The on-event map may include coordinates of pixels where an on-event where an increase in the intensity of light occurs and information about a time when the event occurs. In the on-event and off-event maps, for example, two subscripts (e.g., "i" and "j") of each element indicate coordinates of each pixel of the pixel array 111, and a variable (e.g., "T") of each element indicates a time when an on-event occurs.

The timestamp regenerator 122 may regenerate a timestamp of an event occurred at a bad pixel, such as a noise pixel, a hot pixel, a dead pixel, etc., by using a temporal correlation between the timestamps of adjacent pixels to the bad pixel. A scheme to regenerate a timestamp will be described in detail below.

Figures 12, 13:
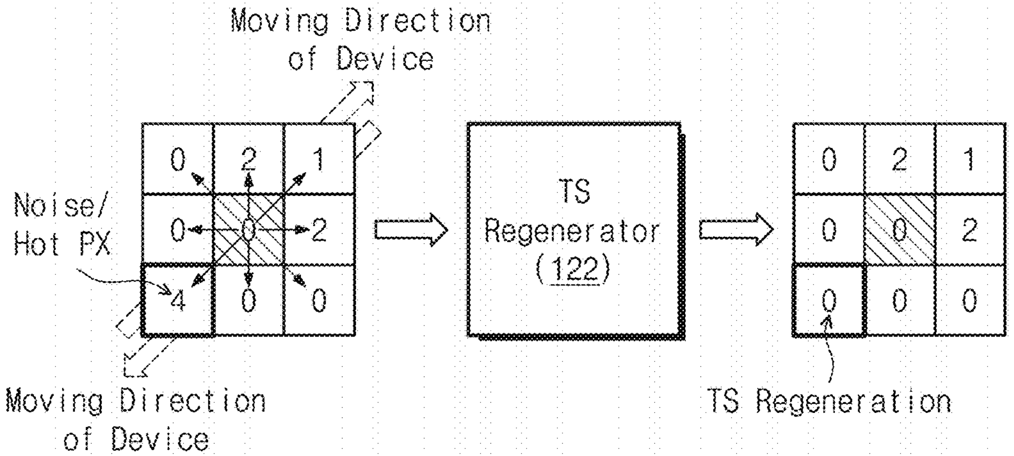
FIG. 12 is a view illustrating how a timestamp regenerator illustrated in FIG. 11 regenerates a timestamp of a noise pixel or a hot pixel according to at least one example embodiment.
FIG. 13 is a view illustrating how an example timestamp regenerator of the inventive concepts determines a noise pixel or a hot pixel according to at least one example embodiment.

FIG. 12 is a view illustrating how the timestamp regenerator 122 illustrated in FIG. 11 regenerates a timestamp of a noise pixel or a hot pixel (e.g., a bad pixel) according to some example embodiments. In at least one example embodiment, timestamps of nine pixels in a 3-by-3 matrix are illustrated as a part of an on-event map or an off-event map illustrated in FIG. 11. An event marked by a timestamp of "1" may indicate an event occurred during a first time period, and an event marked by a timestamp of "2" may indicate an event occurred during a second time period, but the example embodiments are not limited thereto. To help understand, FIG. 12 will be described with reference to FIGS. 1 to 11.

For example, a hatched pixel, which is arranged at the second row and second column, from among the nine pixels indicates a target pixel. A noise pixel mentioned in the example embodiment of FIG. 12 refers to a pixel that is marked as an event occurs due to a noise occurring at the pixel itself or on the outside of the pixel, even though an event did not actually occur. A hot pixel refers to a pixel that is always marked as an event due to a defect of a pixel itself (e.g., the pixel always outputs a signal indicating that an event has occurred, even if no event has actually occurred). The noise pixel and the hot pixel are similar in that it is marked as an event that has occurred even though an event does not actually occur, thus the noise pixel and the hot pixel are treated similarly by at least one example embodiment.

The processor 120 may monitor the timestamps of a target pixel and the adjacent pixels (e.g., the eight pixels) around the target pixel and may determine a temporal correlation between an event that occurred at the target pixel and events that occurred at the pixels around the target pixel. For example, assuming a first event occurs during a first time period at the target pixel and a second event occurs during a second time period at adjacent pixels around the target pixel after a reference time elapses, the temporal correlation between the first event and the second event may be considered as being very high (and/or strong). In the example embodiment of FIG. 12, "adjacent pixels" may be mentioned to designate eight pixels around the target pixel, but the example embodiments are not limited thereto.

The processor 120 may appropriately group timestamps based on the temporal correlation. The processor 120 may classify a pixel, which is arranged at the first row and third column and is marked by a timestamp of "1", as a first group. Below, in this specification, the x-th row and y-th column is expressed by [x, y] upon describing a pixel arranged at the x-th row and y-th column. Since pixels arranged at [1, 2] and [2, 3] have a timestamp of "2", an event occurred at the target pixel and events occurred at the pixels arranged at [1, 2] and [2, 3] have the same temporal correlation. Therefore, the processor 120 may classify the pixels arranged at [1, 2] and [2, 3] as a second group. Since pixels arranged at [1, 1], [2, 2], and [3, 3] have a timestamp of "0", an event occurred at the target pixel and events occurred at the pixels arranged at [1, 1], [2, 2], and [3, 3] have the same temporal correlation. Therefore, the processor 120 may classify the pixels arranged at [1, 1], [2, 2], and [3, 3] as a third group.

The processor 120 may determine an outline of an object based on the classified groups. For example, an outline of an object facing a right bottom direction from the left top may be determined on the basis of the addresses of the pixels that are arranged at [1, 2] and [2, 3] and are marked by the timestamp of "2" and the addresses of the pixels that are arranged at [1, 1], [2, 2], and [3, 3] and are marked by the timestamp of "0".

In addition, the processor 120 may determine a moving direction of an object based on a timestamp of a classified group. For example, the processor 120 may determine that an object moves in a left bottom direction from the right top, based on that a timestamp belonging to the first group is "1" and timestamps belonging to the second group are "2". Also, the processor 120 may determine a speed and/or acceleration of the object with reference to the moving direction of the object and locations and/or values of grouped timestamps.

Alternatively or additionally, the processor 120 may determine a moving direction of the vision sensor 110 based on a timestamp of a classified group. The reason is that the same timestamp as illustrated in FIG. 12 is obtained even in the case where the object is still and the vision sensor 110 moves in a right top direction from the left bottom. In this case, the processor 120 may determine a speed of the vision sensor 110 with reference to the moving direction of the vision sensor 110 and the locations and/or values of the grouped timestamps. However, this is only relative, and the example embodiments of the inventive concepts may be equally applied to the case where only the vision sensor 110 moves and the case where both an object and the vision sensor 110 move.

The processor 120 may determine a temporal correlation between an event occurred at the target pixel and events that occurred at pixels included in the third group. For example, since all events that occurred at the target pixel and the pixels arranged at [1, 1] and [3, 1] have a timestamp of "0", the processor 120 may determine that the occurrence of an event ends.

In addition, the processor 120 may determine a temporal correlation between an event that occurred at the target pixel and an event that occurred at a pixel arranged at [3, 1]. However, considering that an object moves in a left bottom direction from the right top, for example, and that the occurrence of an event ends after a timestamp of "2" is marked at the events that occurred at the pixels belonging to the second group, a temporal correlation between the event occurred at the target pixel and the event that occurred at a pixel arranged at [3, 1] may be very low (or weak). That is, the probability that the event that occurred at a pixel arranged at [3, 1] comes from noise or a defect of a pixel itself (i.e., a hot pixel, etc.) is high. As a result, the processor 120 may determine the pixel arranged at [3, 1] as a bad pixel, a noise pixel, a hot pixel, etc., based on the temporal correlation.

The timestamp regenerator 122 may replace a timestamp (i.e., "4") of the pixel determined as the noise pixel or the hot pixel with a timestamp (i.e., "0") of the target pixel. That is, the timestamp regenerator 122 may update a timestamp of the on-event map or the off-event map stored in the memory 130 based on the results of the determination.

However, considering a moving direction of an object (and/or a vision sensor), since a timestamp of the pixel arranged at [3, 1] illustrated in FIG. 12 is suddenly marked by "4", it may be understood that such marking comes from an abnormal event due to a defect of a pixel itself. However, in some cases, it may be difficult to determine whether a timestamp comes from the occurrence of a normal event or comes from a noise pixel or a hot pixel (e.g., a bad pixel). An operation of the timestamp regenerator 122 associated with such a case will be described with reference to FIGS. 13 and 14.

FIG. 13 is a view illustrating how the timestamp regenerator 122 of at least one example embodiment of the inventive concepts determines a noise pixel or a hot pixel. Unlike the example embodiment described with reference to FIG. 12, adjacent pixels around a target pixel may be considered to determine a bad pixel, a noise pixel or a hot pixel more exactly. In the example embodiment of FIG. 13, “adjacent pixels” may be mentioned to designate 24 pixels around the target pixel, but the example embodiments are not limited thereto and any number of pixels may be used as the adjacent pixels.

The processor 120 may monitor timestamps of the target pixel and 24 pixels around the target pixel to determine a temporal correlation. As in the description given with reference to FIG. 12, a pixel where an event marked by a timestamp of “1” occurs may be classified as a first group, pixels where an event marked by a timestamp of “2” occurs may be classified as a second group, and pixels where an event marked by a timestamp of “3” occurs may be classified as a third group, etc.

The processor 120 may determine an outline of an object based on that the pixels belonging to the second group have the timestamp of “2” and that the pixels belonging to the third group have the timestamp of “3”. In addition, the processor 120 may determine the direction of travel of an object and/or the vision sensor, for example, that an object moves in a left bottom direction from the right top, based on the timestamps belonging to the groups of timestamps, e.g., the first to third groups.

The processor 120 may determine a temporal correlation between an event that occurred at the target pixel and events that occurred at the pixels belonging to the first to third groups and may determine that the occurrence of an event ends after events occur at the pixels belonging to the third group.

In addition, the processor 120 may determine a temporal correlation between the event that occurred at the target pixel and an event that occurred at a pixel arranged at [4, 2]. Like the example embodiment described with reference to FIG. 12, if the processor 120 considers only timestamps of the eight pixels around the target pixel, it is likely that the timestamp of “2” associated with the pixel arranged at [4, 2] is determined as coming from a noise pixel or a hot pixel (e.g., a bad pixel).

However, the processor 120 may further monitor timestamps arranged at [4, 1], [5, 2], and [5, 1] for the purpose of reducing and/or preventing the pixel arranged at [4, 2] from being determined as a noise pixel or a hot pixel (e.g., a bad pixel) abnormally and/or inaccurately. According to the timestamps illustrated in FIG. 13, it is reasonable to determine that a new event occurs at pixels arranged at [4, 2], [4, 1], [5, 2], and [5, 1]. On the contrary, considering a direction in which an object moves, it may be likely that the target pixel arranged at [3, 3] is a dead pixel.

In conclusion, even if the target pixel is the dead pixel or not, the pixel arranged at [4, 2] should not be determined as a noise pixel or a hot pixel (e.g., a bad pixel). The processor 120 may determine the pixel arranged at [4, 2] as a normal pixel by extending a range of pixels to be monitored. In this case, the timestamp regenerator 122 may not operate.

Figure 14:
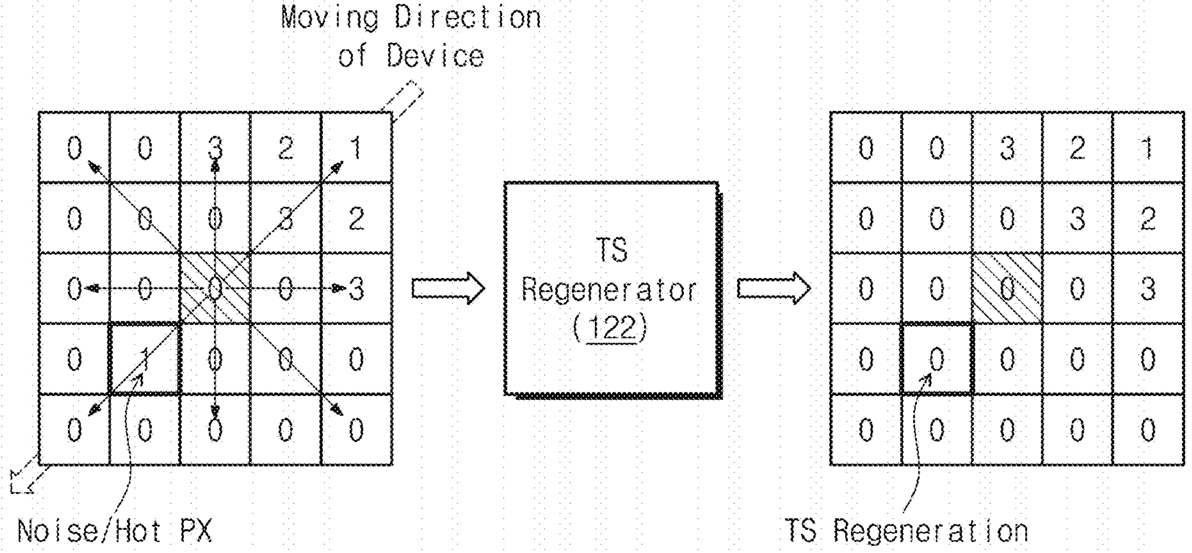
FIG. 14 is a view illustrating how an example processor of the inventive concepts determines a noise pixel or a hot pixel according to at least one example embodiment.

FIG. 14 is a view illustrating how the processor 120 of at least one example embodiment of the inventive concepts determines a noise pixel or a hot pixel (e.g., a bad pixel). As in the description given with reference to FIG. 13, 24 pixels around a target pixel may be considered.

As in at least one of the above example embodiments, the processor 120 may group (or classify) pixels. The processor 120 may determine an outline of an object and/or the direction of movement of the object and/or the vision sensor, e.g., that the object moves in a left bottom direction from the right top, only in consideration of temporal correlations between an event that occurred at the target pixel and events that occurred at pixels around the target pixel.

The processor 120 may further monitor timestamps of pixels arranged at [4, 1], [5, 2], and [5, 1] as well as a timestamp arranged at [4, 2] and may determine a temporal correlation. For example, since a timestamp of an event occurred at the target pixel is “0” and a timestamp of an event that occurred at a pixel arranged at [4, 2] is “1”, a temporal correlation may somewhat exist between the event that occurred at the target pixel and the event that occurred at a pixel arranged at [4, 2]. That is, the processor 120 may determine that an event coming from fine movement of a very small object occurred at the pixel arranged at [4, 2] based on the temporal proximity of the timestamps.

However, in a particular case, an event sensed at the pixel arranged at [4, 2] may come from a very fine noise or a defect of a pixel itself (e.g., a hot pixel, etc.). Therefore, since all timestamps of eight pixels adjacent to the pixel arranged at [4, 2] are “0”, the processor 120 may determine that a very fine noise occurred at the pixel arranged at [4, 2](e.g., that the event signaled at the pixel arranged at [4, 2] was an error and/or noise, etc.).

The timestamp regenerator 122 may replace a timestamp of the pixel arranged at [4, 2] with “0” based on the determination of the processor 120. The reason is that, if the pixel arranged at [4, 2] is a bad pixel (e.g., a noise pixel or a hot pixel), a timestamp thereof should be replaced with “0”. Also, the reason is that, even if an event actually occurred at the pixel arranged at [4, 2], event corresponds to fine movement (e.g., small movement) of a very small object, and should be considered as no event occurring (and/or a non-event), and thus approximation is possible.

Figure 15:
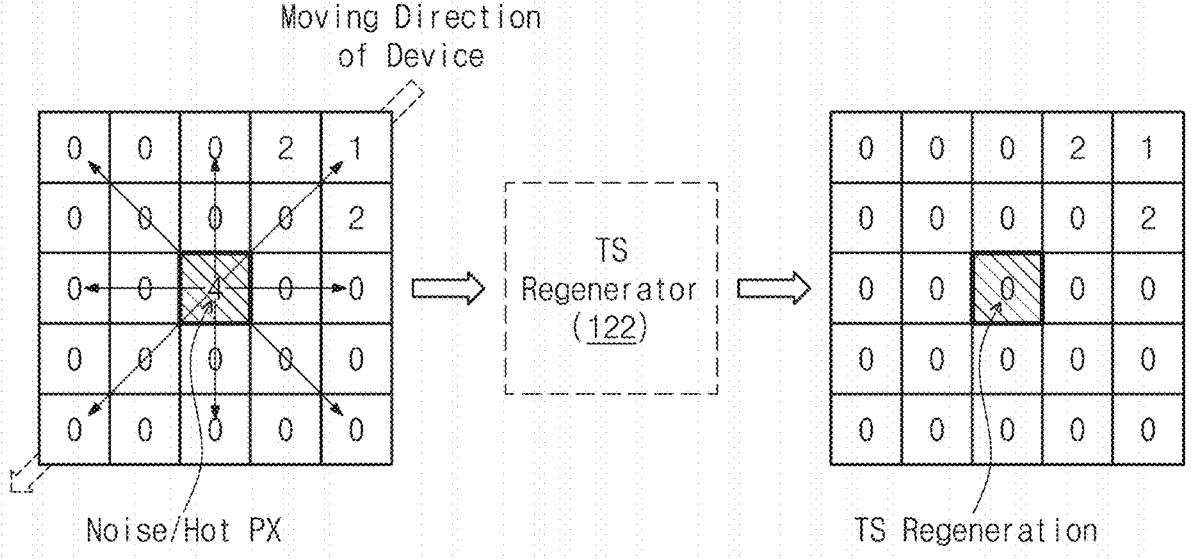
FIG. 15 is a view illustrating how an example timestamp regenerator of the inventive concepts regenerates a timestamp of a noise pixel or a hot pixel according to at least one example embodiment.

FIG. 15 is a view illustrating how the timestamp regenerator 122 of at least one example embodiment of the inventive concepts regenerates a timestamp of a noise pixel or a hot pixel (e.g., a bad pixel).

As in at least one of the above example embodiments, the processor 120 may group (or classify) timestamps appropriately. The processor 120 may determine a direction in which an object and/or the vision sensor moves, and may determine that an event that occurred at a target pixel is an abnormal event (e.g., an erroneous event and/or an event to be ignored), based on a temporal correlation between the event that occurred at the target pixel and events that occurred at pixels around the target pixel.

For example, the timestamp regenerator 122 may replace a timestamp (i.e., “4”) of the target pixel with a timestamp (i.e., “0”) of pixels adjacent to the target pixel based on the determination result of the processor 120 (e.g., if the processor 120 determines that the event was an abnormal event, etc.). The replacement may be made by updating the on-event map or the off-event map stored in the memory 130.

Figure 16:
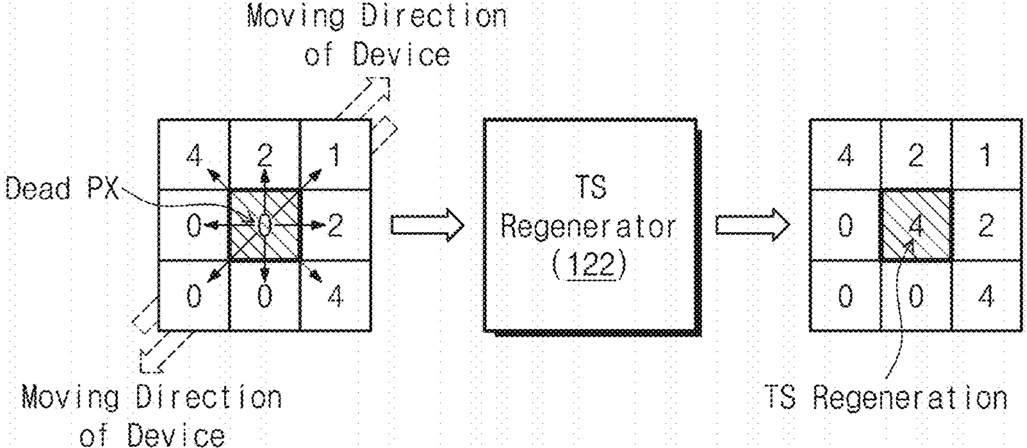
FIG. 16 is a view illustrating how an example timestamp regenerator of the inventive concepts regenerates a timestamp of a dead pixel according to at least one example embodiment.

FIG. 16 is a view illustrating how the timestamp regenerator 122 of at least one example embodiment of the inventive concepts regenerates a timestamp of a dead pixel. In at least one example embodiment, timestamps of nine pixels in a 3-by-3 matrix are illustrated as a part of an on-event map or an off-event map illustrated in FIG. 11. To help with the understanding of at least one of the example embodiments, FIG. 16 will be described with reference to FIGS. 1 to 11.

A hatched pixel illustrated in FIG. 16, which is arranged at [2, 2], from among the nine pixels indicates a target pixel.

In the example embodiment of FIG. 16, a dead pixel refers to a pixel that is marked as no event having occurred even though an event actually occurs, due to a cause such as a defect of a pixel itself. In other words, the dead pixel fails to output a signal indicating that an event has been sensed by the pixel, even though the pixel should output a signal indicating that an event has occurred at the pixel.

The processor 120 may classify a pixel arranged at [1, 3] as a first group. The processor 120 may classify pixels where an event marked by a timestamp of "2" occurs at [1, 2] and [2, 3], as a second group. The processor 120 may determine an outline of an object and/or that the object (and/or the vision sensor) moves in a direction, e.g., a left bottom direction from the right top, based on the classified groups and development of changes in timestamps of pixels belonging to the groups of pixels, e.g., the first and second groups.

The processor 120 may determine a temporal correlation between an event that occurred at a target pixel and events that occurred at pixels (excluding the target pixel) adjacent to the pixels belonging to the second group. That is, the processor 120 may determine a temporal correlation between events that occurred at the target pixel and pixels arranged at [1, 1] and [3, 3]. Since a timestamp of the event occurred at the target pixel is "0" and a timestamp of the events that occurred at the pixels arranged at [1, 1] and [3, 3] is "4", the processor 120 may determine that the event that occurred at the target pixel is an abnormal event (i.e., a dead pixel, etc.).

The timestamp regenerator 122 may replace the timestamp (i.e., "0") of the target pixel determined as a dead pixel with a timestamp (i.e., "4") having the greatest value among the surrounding timestamps. The reason is that the probability that a timestamp of events that occurred at two adjacent pixels that sharply changes is very low considering the movement and outline of the object.

Figure 17:
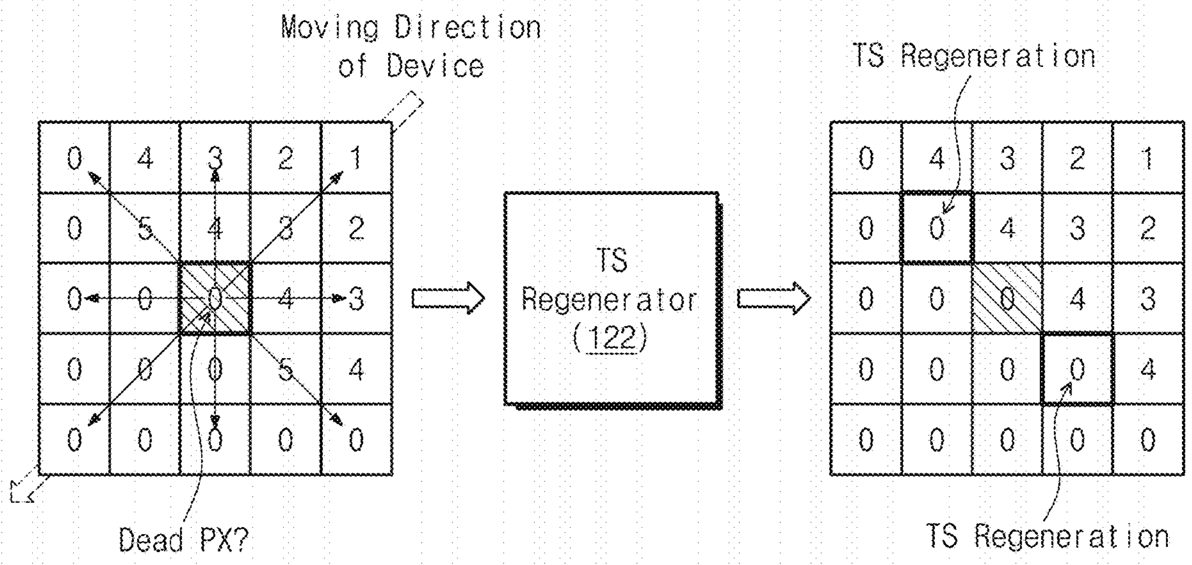
FIG. 17 is a view illustrating how an example processor of the inventive concepts determines a dead pixel according to at least one example embodiment.

FIG. 17 is a view illustrating how the processor 120 of at least one example embodiment of the inventive concepts determines a dead pixel (e.g., a bad pixel). Unlike the example embodiment described with reference to FIG. 16, 24 pixels around a target pixel may be considered, but is not limited thereto. The reason is that the probability that pixels arranged at [1, 1] and [3, 3] are dead pixels is not able to be excluded, even though a target pixel is normal in the example embodiment of FIG. 16.

As in at least one of the above example embodiments, the processor 120 may group (or classify) pixels based on the timestamps associated with the pixels, or in other words, based on the timestamps associated with the events generated by the pixels. For example, the processor 120 may classify a pixel where an event marked by a timestamp of "1" occurs, as a first group. The processor 120 may classify pixels where events marked by a timestamp of "2" occur, as a second group. A third group and a fourth group are classified to be similar to a manner described above.

The processor 120 may determine an outline and/or a moving direction of an object (and/or the vision sensor) in consideration of timestamps of events that occurred at pixels belonging to the respective groups and development of changes in the timestamps. For example, the processor 120 may determine that an object moves from the right top to the left bottom and that an outline of the object is a diagonal line facing from the left top to the right bottom based on the values of the timestamps of the pixels and/or trends in the values of the timestamps of the pixels. For example, in FIG. 17, the moving direction may be determined based on an examination of the timestamp values of the events generated by the pixel array and/or the groups assigned to the pixels of the pixel array. At pixel [5, 1], the timestamp value is 1, at pixels [4, 1] and [5, 2] the timestamp values are 2, at pixels [3, 1], [2, 4], and [3, 5] the timestamp values are 3, at pixels [1, 2], [2, 3], [3, 4], and [4, 5] the timestamp values are 4, at pixels [2, 2] and [4, 4] the timestamp values 5, and the remaining pixels have a timestamp value of 0. Based on the timestamp values (and/or the group assigned to the events) of the pixel array and/or the trend in the timestamp values, the direction of the object is determined to start at pixel [1, 5] due to it having the earliest timestamp value, and continuing in the top to bottom and right to left direction.

Additionally, the processor 120 may determine a temporal correlation between an event that occurred at the target pixel and events that occurred at pixels adjacent to the target pixel. Considering the moving direction and/or the outline of the object (and/or the vision sensor), events that occurred at certain pixels, may be determined to be abnormal events due to discrepancies and/or differences in the timestamp values of the pixels in comparison with the timestamp values of the adjacent pixels and the moving direction and/or outline of the object (and/or the vision sensor). In other words, one or more events and/or pixels may be determined to be abnormal based on the determined moving direction and/or outline of the object (and/or the vision sensor) and the expected timestamp values (and/or events that occurred or did not occur) for those pixels.

For example in FIG. 17, based on the determined moving direction of the object, the pixels arranged at [2, 2] and [4, 4], or the events that occurred at the target pixel and pixels arranged at [1, 1] and [5, 5] may be abnormal events. In this case, the processor 120 may determine that events that occurred at the pixels arranged at [2, 2] and [4, 4] are abnormal events (i.e., are events caused by a noise pixel or a hot pixel, etc.). The reason is that the probability that two pixels (e.g., the pixels at [2, 2] and [4, 4]) are defective is higher than the probability that three pixels (e.g., the target pixel [3, 3] and the pixels at [1, 1] and [5, 5]) are defective. However, the example embodiments are not limited thereto, and the target pixel may be any pixel of the pixel array.

The timestamp regenerator 122 may replace timestamps arranged at [2, 2] and [4, 4] determined as being a bad pixel, e.g., a noise pixel or a hot pixel, etc., with a timestamp value associated with the timestamp values of the other pixels and/or events in the group associated with the pixel (e.g., "0"), based on the determination result of the processor 120.

According to the scheme described with reference to FIGS. 12 to 17, the same effect as a normal event occurs at a noise pixel, a hot pixel, and a dead pixel may be obtained. Therefore, the performance of the image processing device may be improved. In addition, since various beneficial improvements are achieved, such as improvement of the yield of a pixel array, repair of bad pixels in pixel arrays that are in use by end users, etc., the manufacturing costs of the image processing device may decrease and/or the service life and reliability of image processing devices may be increased.

Figure 18:
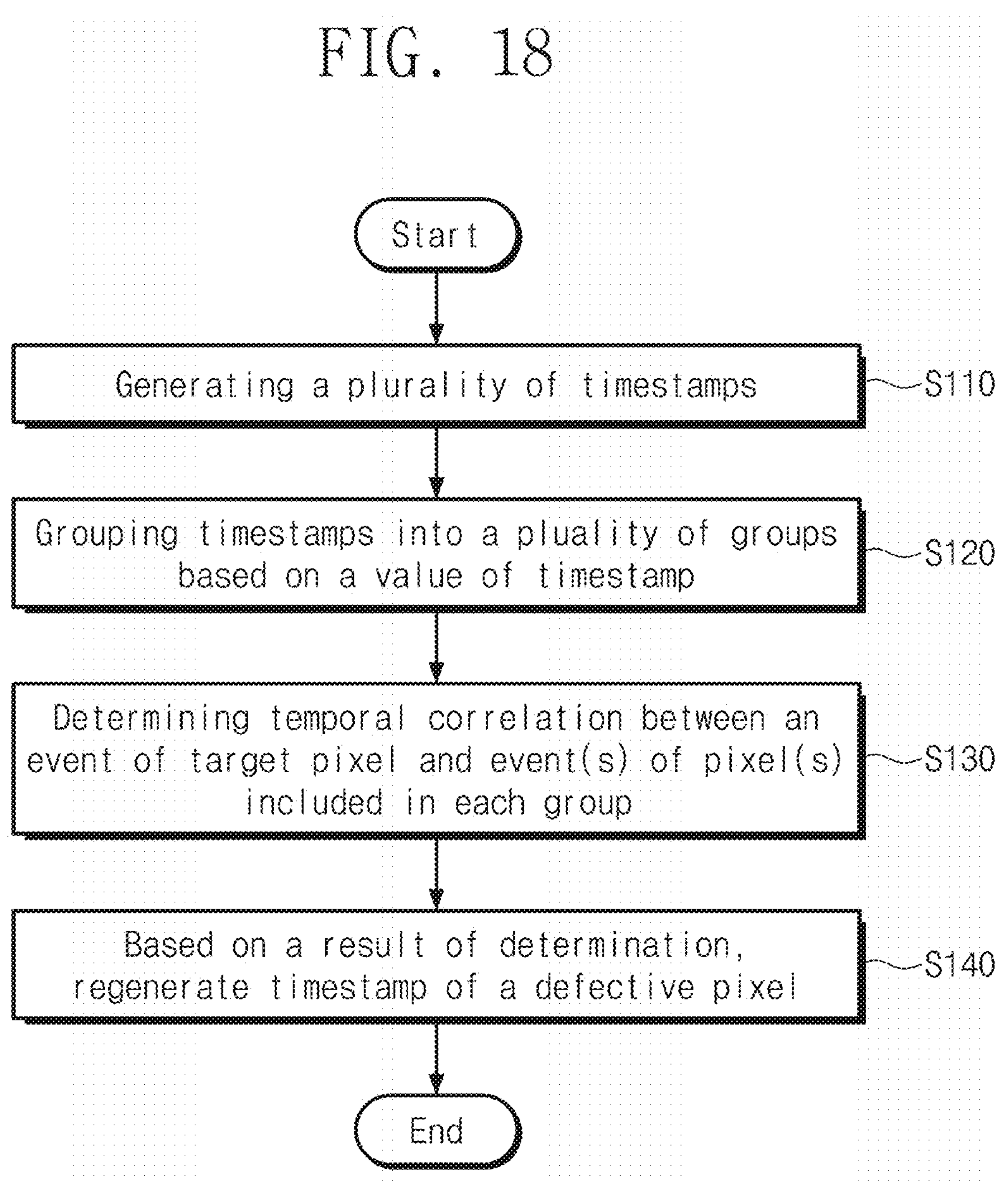
FIG. 18 is a flowchart illustrating a timestamp regeneration scheme according to at least one example embodiment of the inventive concepts.

FIG. 18 is a flowchart illustrating a timestamp regeneration scheme according to at least one example embodiment of the inventive concepts. To help with the understanding of at least one of the example embodiments, FIG. 18 will be described with reference to FIGS. 12 to 17.

In operation S110, a plurality of timestamps may be generated. The timestamp may indicate information about a time when an event occurs.

In operation S120, the plurality of timestamps may be classified into a plurality of groups. For example, events occurred at pixels arranged at [1, 2], [2, 3], [3, 4], and [4, 5]

may be classified as a fourth group. First to third groups may include pixels classified to be similar to the above-described manner.

An outline and/or a moving direction of an object may be determined on the basis of timestamps belonging to the respective groups and the development of changes in the timestamps. For example, referring to FIG. 16, it may be determined that an object moves from the right top to the left bottom and that the outline of the object is a diagonal line facing from the left top to the right bottom based on the observed timestamps of the pixels.

In operation S130, a temporal correlation between an event that occurred at a target pixel and events that occurred at pixels included in each group may be determined. In addition, a temporal correlation between the event that occurred at the target pixel and events that occurred at pixels adjacent to a group where the last event occurs may be further determined. Considering the outline of the object determined from a timestamp belonging to the fourth group and/or a moving direction of the object (and/or the vision sensor), a part of events occurred at pixels arranged at [1, 1], [2, 2], [3, 3], [4, 4], and [5, 5] may be abnormal events. In this case, the processor 120 may determine that the pixels arranged at [2, 2] and [4, 4] are bad pixels (e.g., a noise pixel or a hot pixel, etc.).

In operation S140, a timestamp of a bad pixel may be regenerated on the basis of the determination result of operation S130. For example, the timestamp regenerator 122 of FIG. 17 may replace timestamps of the pixels arranged at [2, 2] and [4, 4] with "0".

Figure 19:
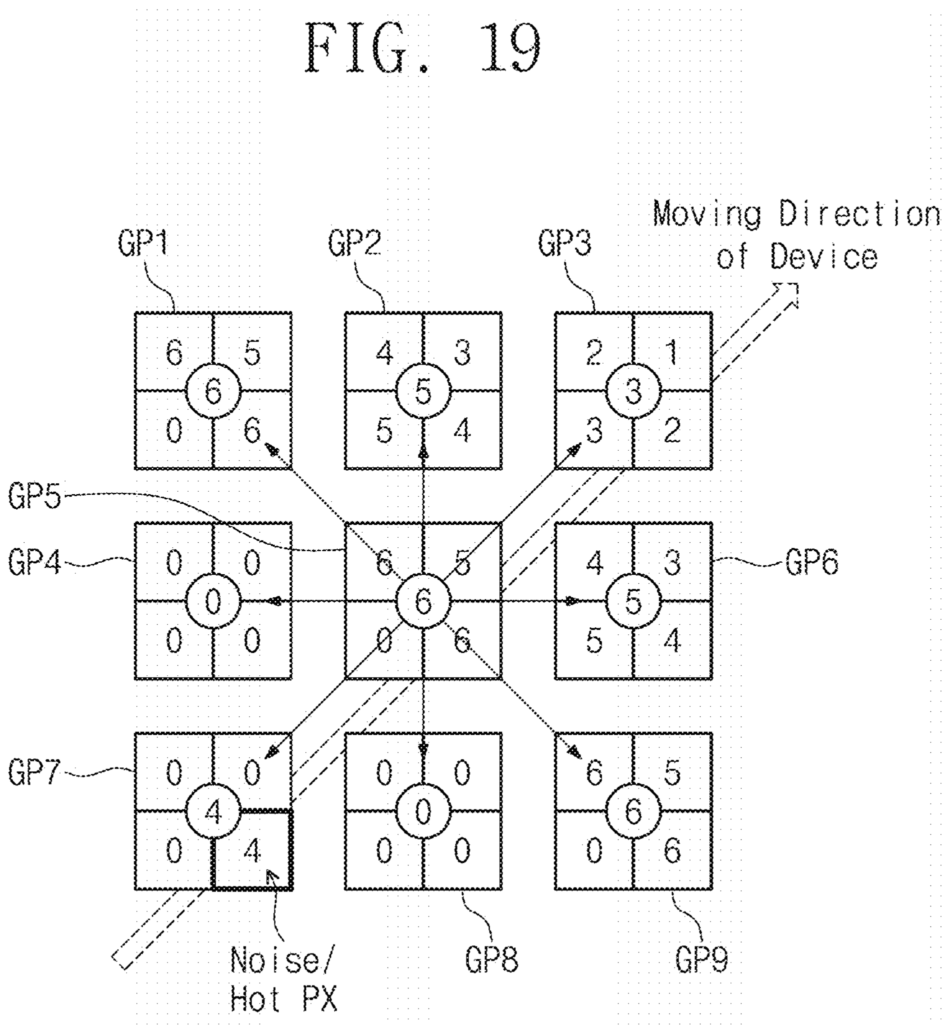
FIGS. 19 and 20 are views illustrating a process in which a timestamp regeneration scheme of the inventive concepts is applied to a sub sampling process according to at least one example embodiment.
Figure 20:
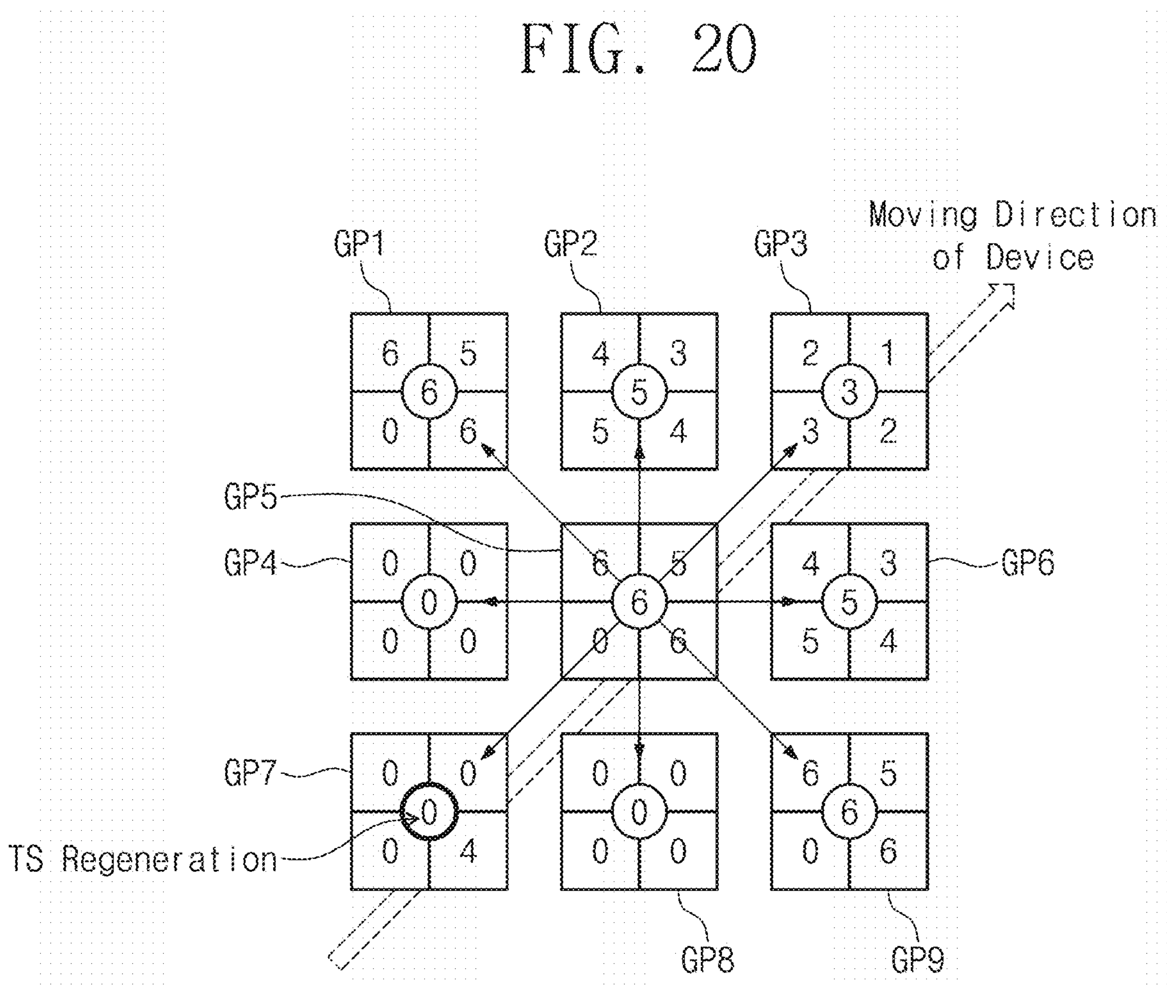

FIGS. 19 and 20 are views illustrating a process in which a timestamp regeneration scheme of some example embodiments of the inventive concepts is applied to a sub sampling process. To help with the understanding of at least one of the example embodiments, FIGS. 19 and 20 will be described together with reference to FIGS. 1 to 11.

Referring to FIG. 19, a plurality of pixels may be classified into a plurality of groups GP1 to GP9. For example, the first group GP1 includes pixels arranged at [1, 1], [1, 2], [2, 1], and [2, 2]. The second group GP2 includes pixels arranged at [1, 3], [1, 4], [2, 3], [2, 4]. Likewise, each of the remaining groups GP3 to GP9 may include a plurality of pixels. At least one example embodiment is illustrated as four pixels are classified as one group. However, the number of pixels belonging to each group are not limited thereto and may be determined to coincide with a resolution to be implemented through sub sampling.

In at least one example embodiment of the inventive concepts, the term "sub sampling" refers to a technique for reducing the throughput of data by reducing the number of pixels (e.g., considering only the output of a subset of the entire number of pixels). For example, if 6-by-6 pixels are classified into a plurality of groups GP1 to GP9 and a representative value is selected from the timestamp values of pixels included in each group, the output of the 6-by-6 pixels may be treated as events occurring at 3-by-3 pixels (e.g., a 3×3 sub sample of the 6×6 pixel array may be derived by using representative values from each group of the 6×6 pixel array).

For example, according to the sub sampling technique, a timestamp, which corresponds to an event that has occurred the most lately (e.g., the most recently and/or the latest, etc.), from among timestamps of pixels belonging to each group may be selected as a representative value. However, the example embodiments are not limited thereto and a timestamp of an event that first occurred may be selected as a representative value, or a timestamp of an intermediate value may be selected as a representative value, etc. For example, an event occurred the most lately among events occurred at pixels belonging to the first group GP1 has occurred at pixels marked by "6". Therefore, a sub-sampled timestamp of the first group GP1 may be "6". The sub sampling may be performed on the remaining groups GP2 to GP9 in a similar manner. A sub-sampled timestamp of each group is expressed by a number marked in circle.

Meanwhile, it is assumed that a pixel that belongs to the seventh group GP7 and is arranged at [6, 2] is a bad pixel, e.g., a noise pixel or a hot pixel. Even though occurrence of events at pixels marked by a timestamp of "6" ends, the sub-sampled timestamp of the seventh group GP7 is "4" by the above-described sub sampling technique. The timestamp regeneration scheme of at least one example embodiment of the inventive concepts may be equally applied to the case where the sub sampling technique is applied.

Referring to FIG. 20, the processor may determine a moving direction of an object (and/or a vision sensor) based on the sub-sampled timestamps of the groups of pixels. For example, in consideration of the fact that a sub-sampled timestamp of the third group GP3 is "3", a sub-sampled timestamp of the second and sixth groups GP2 and GP6 is "5", and a sub-sampled timestamp of the first, fifth, and ninth groups GP1, GP5, and GP9 is "6". Also, the processor 120 may determine that occurrence of an event ends, in consideration of the fact that a sub-sampled timestamp of the fourth and eighth groups GP4 and GP8 is "0".

In addition, the processor 120 may determine a temporal correlation between timestamps of the plurality of groups GP1 to GP9. For example, the processor 120 may determine that the sub-sampled timestamp "4" of the seventh group GP7 comes from an abnormal event, based on the fact that the sub-sampled timestamp of the fourth and eighth groups GP4 and GP8 is "0" but the sub-sampled timestamp of the seventh group GP7 is "4". The reason is that a sharp change of the sub-sampled timestamp from "0" to "4" is abnormal, considering a moving direction of the object (and/or vision sensor).

The timestamp regenerator 122 may regenerate the sub-sampled timestamp of the seventh group GP7 having an abnormal representative value. For example, the timestamp regenerator 122 may replace the sub-sampled timestamp of the seventh group GP7 with an adjacent sub-sampled timestamp. For example, the sub-sampled timestamp "4" of the seventh group GP7 may be replaced with the sub-sampled timestamp "0" of the fourth and eighth groups GP4 and GP8 adjacent to the seventh group GP7.

FIG. 21 is a block diagram illustrating an electronic device to which an image processing device according to at least one example embodiment of the inventive concepts. For example, the electronic device 1000 may be implemented with a smartphone, a tablet computer, a desktop computer, a laptop computer, a wearable device, a home automation device, a security camera, etc. In addition, the electronic device 1000 may be implemented with one of various types of electronic devices, which are needed to operate an unmanned security system, an Internet of things device, an industrial robot, an autonomous vehicle, an industrial quality assurance device, etc.

The electronic device 1000 may include an image processing device 1100, a main processor 1200, a working memory 1300, storage 1400, a display 1500, a communication block 1600, and/or a user interface 1700, but is not limited thereto.

The image processing device 1100 may be an image processing device implemented to execute the scheme described with reference to FIGS. 1 to 20.

Meanwhile, the timestamp regeneration scheme may be performed as special purpose software or firmware (e.g., special purpose computer readable instructions) executed by the main processor 1200 instead of a processor 1120. In this case, a timestamp regenerator 1310 that is special purpose firmware or software to realize the timestamp regeneration scheme may be loaded on the working memory 1300, and the main processor 1200 may drive the timestamp regenerator 1310. In this case, since the timestamp regeneration scheme is driven/processed by the main processor 1200, the processor 1120 may be omitted.

The working memory 1300 may store data to be used for an operation of the electronic device 1000. For example, the working memory 1300 may temporarily store packets or frames processed by the processor 1120. For example, the working memory 1300 may include a volatile memory, such as a dynamic random access memory (DRAM) a synchronous DRAM (SDRAM), or the like, and/or a nonvolatile memory, such as a phase-change RAM (PRAM), a magneto-resistive RAM (MRAM), a resistive RAM (ReRAM), a ferroelectric RAM (FRAM), or the like.

The storage 1400 may store special purpose firmware or software for performing the timestamp regeneration scheme. The firmware or software includes computer readable instructions for performing the timestamp regeneration scheme, which may be read from the storage 1400 depending on a request or a command of the main processor 1200 and may be loaded on the working memory 1300. The storage 1400 may include a nonvolatile memory device such as a flash memory, a PRAM, a MRAM, a ReRAM, a FRAM, or the like.

The display 1500 may include a display panel and a display serial interface (DSI) peripheral circuit. For example, the display panel may be implemented with various devices such as a liquid crystal display (LCD) device, a light emitting diode (LED) display device, an organic LED (OLED) display device, an active matrix OLED (AMOLED) display device, and the like. A DSI host embedded in the main processor 1200 may perform serial communication with the display panel through a DSI. The DSI peripheral circuit may include a timing controller, a source driver, and the like, which are needed to drive the display panel.

The communication block 1600 may exchange signals with an external device/system through an antenna. A transceiver 1610 and a modulator/demodulator (MODEM) 1620 of the communication block 1600 may process signals exchanged with the external device/system, depending on a wireless communication protocol such as long term evolution (LTE), worldwide interoperability for microwave access (WiMax), global system for mobile communication (GSM), code division multiple access (CDMA), Bluetooth, near field communication (NFC), wireless fidelity (Wi-Fi), radio frequency identification (RFID), etc.

The user interface 1700 may include at least one of input interfaces such as a keyboard, a mouse, a keypad, a microphone, a camera, a button, a touch panel, a touch screen, a touch pad, a touch ball, a gyroscope sensor, a vibration sensor, an acceleration sensor, and the like.

Components of the electronic device 1000 may exchange data based on one or more of various interface protocols such as a universal serial bus (USB), a small computer system interface (SCSI), peripheral component interconnect express (PCIe), mobile PCIe (M-PCIe), advanced technology attachment (ATA), parallel ATA (PATA), serial ATA (SATA), a serial attached SCSI (SAS), integrated drive electronics (IDE), enhanced IDE (EIDE), nonvolatile memory express (NVMe), universal flash storage (UFS), and the like.

According to various example embodiments of the inventive concepts, the performance of an image processing device may be improved by regenerating a timestamp of an event that occurred at a bad pixel.

In addition, since the bad pixel is to be treated similarly to a normal pixel, the yield of a pixel array of the image processing device may be improved.

While the inventive concepts has been described with reference to example embodiments thereof, it will be apparent to those of ordinary skill in the art that various changes and modifications may be made thereto without departing from the spirit and scope of the inventive concepts as set forth in the following claims.

What is claimed is:

1. A dynamic vision sensor comprising:

a plurality of photodiodes including a first photodiode of a first pixel;

an amplifier configured to amplify a voltage level corresponding to charges generated by the first photodiode;

a comparator configured to determine a type of an event based on the voltage level of the charges and output an on-event or an off-event;

a first address event representation configured to generate a first address of the first pixel;

a second address event representation configured to generate a second address of the first pixel; and a packetizer configured to generate a packet, the packet including a timestamp of the first pixel, the first address of the first pixel and the second address of the first pixel, wherein the amplifier and the comparator are disposed in a first semiconductor chip, wherein the first and second address event representation are disposed in a second semiconductor chip, and wherein the first semiconductor chip is stacked on the second semiconductor chip.

2. The dynamic vision sensor of claim 1, wherein the packet further includes polarity information of the first pixel, and wherein the polarity information indicates the on-event or the off-event.

3. The dynamic vision sensor of claim 2, wherein the timestamp of the first pixel includes M number of bits, wherein the first address of the first pixel includes N number of bits, wherein M is different from N, and wherein M and N are integers.

4. The dynamic vision sensor of claim 3, wherein the first semiconductor chip and the second semiconductor chip are connected to each other via through silicon vias.

5. The dynamic vision sensor of claim 3, wherein the first address event representation is further configured to generate the polarity information of the first pixel and the timestamp of the first pixel.

6. The dynamic vision sensor of claim 5, wherein the first address event representation is further configured to receive the second address of the first pixel.

7. The dynamic vision sensor of claim 5, wherein the first address is a row address and the second address is a column address.

8. The dynamic vision sensor of claim 5, further comprising:

a control logic configured to request the first address event representation to perform scanning on pixels of the dynamic vision sensor.

9. The dynamic vision sensor of claim 5, wherein the packetizer is configured to generate the packet in an asynchronous manner.

10. The dynamic vision sensor of claim 8, wherein the control logic is disposed in the second semiconductor chip.

11. The dynamic vision sensor of claim 9, further comprising:

a time stamper configured to generate the timestamp of the first pixel, wherein the time stamper is disposed in the second semiconductor chip.

12. A dynamic vision sensor comprising:

a plurality of photodiodes including a first photodiode of a first pixel;

an amplifier configured to amplify a voltage level corresponding to charges generated by the first photodiode;

a comparator configured to determine a type of an event based on the voltage level of the charges and output an on-event or an off-event;

a first address event representation configured to generate a first address of the first pixel;

a second address event representation configured to generate a second address of the first pixel; and a packetizer configured to generate a packet, the packet including a timestamp of the first pixel, the first address of the first pixel and the second address of the first pixel, wherein the photodiode is disposed in a first semiconductor chip, wherein the first and second address event representation are disposed in a second semiconductor chip, and wherein the first semiconductor chip is stacked on the second semiconductor chip.

13. The dynamic vision sensor of claim 12, wherein the amplifier and the comparator are disposed in the first semiconductor chip.

14. The dynamic vision sensor of claim 12, wherein the packet further includes polarity information of the first pixel, and wherein the polarity information indicates the on-event or the off-event.

15. The dynamic vision sensor of claim 14, wherein the timestamp of the first pixel includes M number of bits, wherein a row address of the first pixel includes N number of bits, wherein M is different from N, and wherein M and N are integers.

16. The dynamic vision sensor of claim 12, wherein the comparator is disposed in the first semiconductor chip.

17. The dynamic vision sensor of claim 15, wherein the first semiconductor chip and the second semiconductor chip are connected to each other via through internal wires.

18. The dynamic vision sensor of claim 17, wherein the first address event representation is further configured to receive the second address of the first pixel.

19. The dynamic vision sensor of claim 17, further comprising:

a time stamper configured to generate the timestamp of the first pixel, wherein the time stamper is disposed in the second semiconductor chip.

20. A dynamic vision sensor comprising:

a plurality of photodiodes including a first photodiode of a first pixel;

an amplifier configured to amplify a voltage level corresponding to charges generated by the first photodiode;

a comparator configured to determine a type of an event based on the voltage level of the charges and output an on-event or an off-event;

a first address event representation configured to generate a first address of the first pixel;

a second address event representation configured to generate a second address of the first pixel; and a packetizer configured to generate a packet, the packet including a timestamp of the first pixel, polarity information of the first pixel, the first address of the first pixel and the second address of the first pixel, wherein the comparator is disposed in a first semiconductor chip, wherein the first and second address event representation are disposed in a second semiconductor chip, wherein the polarity information indicates the on-event or the off-event, wherein the timestamp of the first pixel includes M number of bits, wherein a row address of the first pixel includes N number of bits, wherein M is different from N, wherein M and N are integers, wherein the first semiconductor chip is stacked on the second semiconductor chip.

* * * * *